(12) United States Patent
Yamanaka et al.

(10) Patent No.: US 9,604,627 B2
(45) Date of Patent: Mar. 28, 2017

(54) THERMAL MANAGEMENT SYSTEM FOR VEHICLE

(71) Applicant: DENSO CORPORATION, Kariya, Aichi-pref. (JP)

(72) Inventors: Takashi Yamanaka, Kariya (JP); Yasumitsu Omi, Kariya (JP); Koji Miura, Kariya (JP); Norihiko Enomoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/108,748

(22) PCT Filed: Dec. 4, 2014

(86) PCT No.: PCT/JP2014/006057
§ 371 (c)(1),
(2) Date: Jun. 28, 2016

(87) PCT Pub. No.: WO2015/107589
PCT Pub. Date: Jul. 23, 2015

(65) Prior Publication Data
US 2016/0318499 A1 Nov. 3, 2016

(30) Foreign Application Priority Data

Jan. 15, 2014 (JP) .................................. 2014-004793

(51) Int. Cl.
*B60W 20/00* (2016.01)
*B60W 10/06* (2006.01)
(Continued)

(52) U.S. Cl.
CPC ......... *B60W 20/00* (2013.01); *B60H 1/00007* (2013.01); *B60H 1/00278* (2013.01);
(Continued)

(58) Field of Classification Search
CPC ............ B60W 10/30; B60W 2710/246; B60K 2001/005; B60L 1/02; B60L 11/1875;
(Continued)

(56) References Cited

U.S. PATENT DOCUMENTS 8,635,882 B2 * 1/2014 Malvicino .......... B60H 1/00385
62/323.1
2005/0167169 A1 * 8/2005 Gering ............... B60H 1/00278
237/12.3 B
(Continued)

FOREIGN PATENT DOCUMENTS

JP 2013180723 A 9/2013
JP 2014000948 A 1/2014

*Primary Examiner* — Brian Swenson
(74) *Attorney, Agent, or Firm* — Harness, Dickey & Pierce, P.L.C.

(57) ABSTRACT

A controller of a thermal management system for a vehicle controls a first switching valve and a second switching valve to set a battery warming-up state in which a heat medium circulates between a battery-temperature adjustment heat exchanger and a heat-medium heating heat exchanger, and the heat medium does not circulate between a coolant-coolant heat exchanger and a heat-medium heating heat exchanger when both a battery and an engine need to be warmed up. In contrast, the controller controls the first switching valve and the second switching valve to set an engine warming-up state in which the heat medium circulates through between the coolant-coolant heat exchanger and the heat-medium heating heat exchanger while the heat medium does not circulate between a battery-temperature adjustment heat exchanger and the heat-medium heating heat exchanger when a temperature of the battery exceeds a target battery warming-up temperature in the battery warming-up state.

9 Claims, 12 Drawing Sheets

(51) Int. Cl.
*B60W 10/30* (2006.01)
*B60L 1/00* (2006.01)
*B60L 1/02* (2006.01)
*B60L 11/18* (2006.01)
*B60H 1/00* (2006.01)
*B60K 1/04* (2006.01)
*F01P 3/20* (2006.01)
*F01P 5/10* (2006.01)
*F01P 9/06* (2006.01)
*B60K 1/00* (2006.01)

(52) U.S. Cl.
CPC .......... *B60H 1/00899* (2013.01); *B60K 1/04* (2013.01); *B60L 1/003* (2013.01); *B60L 1/02* (2013.01); *B60L 11/1862* (2013.01); *B60L 11/1875* (2013.01); *B60W 10/06* (2013.01); *B60W 10/30* (2013.01); *F01P 3/20* (2013.01); *F01P 5/10* (2013.01); *F01P 9/06* (2013.01); *B60H 2001/00307* (2013.01); *B60K 2001/005* (2013.01); *B60L 2240/34* (2013.01); *B60L 2240/36* (2013.01); *B60L 2240/445* (2013.01); *B60L 2240/545* (2013.01); *B60W 2710/246* (2013.01); *F01P 2005/105* (2013.01); *F01P 2037/02* (2013.01); *F01P 2050/24* (2013.01); *F01P 2060/08* (2013.01); *F01P 2060/18* (2013.01); *Y02T 10/7005* (2013.01); *Y02T 10/705* (2013.01); *Y10S 903/903* (2013.01)

(58) Field of Classification Search
CPC ............. B60L 2240/34; B60L 2240/36; B60L 2240/445; B60L 2240/545; B60L 11/1874; B60H 1/00278; B60H 1/00899; B60H 1/00007; F01P 3/20
See application file for complete search history.

(56) References Cited

U.S. PATENT DOCUMENTS

| | | | |
|---|---|---|---|
| 2009/0280395 A1* | 11/2009 | Nemesh | B60H 1/00278 429/62 |
| 2010/0089547 A1* | 4/2010 | King | B60L 3/0046 165/42 |
| 2015/0101789 A1 | 4/2015 | Enomoto et al. | |
| 2015/0128632 A1* | 5/2015 | Kishita | B60L 11/1875 62/324.6 |
| 2016/0153343 A1 | 6/2016 | Kakehashi et al. | |
| 2016/0318409 A1* | 11/2016 | Rawlinson | B60L 1/003 |

* cited by examiner

FIG. 9    AIR-CONDITIONING HEATING + BATTERY WARMING-UP

FIG. 11   AIR-CONDITIONING HEATING + ENGINE WARMING-UP

THERMAL MANAGEMENT SYSTEM FOR VEHICLE

CROSS REFERENCE TO RELATED APPLICATIONS

This application is a U.S. National Phase Application under 35 U.S.C. 371 of International Application No. PCT/JP2014/006057 filed on Dec. 4, 2014 and published in Japanese as WO 2015/107589 A1 on Jul. 23, 2015. This application is based on and claims the benefit of priority from Japanese Patent Application 2014-004793 filed on Jan. 15, 2014. The entire disclosures of all of the above applications are incorporated herein by reference.

FIELD OF THE INVENTION

The present invention relates to a thermal management system for use in a vehicle.

BACKGROUND ART

Conventionally, hybrid vehicles are separately equipped with cooling circuits in various temperature ranges: e.g., a high-temperature range (approximately 100° C.) for engine cooling, an intermediate-temperature range (approximately 60° C.) for cooling an inverter and a motor generator, and a low-temperature range (40° C.) for cooling a battery pack.

In this way, various cooling circuits are mounted on the vehicle, which cause problems, such as a complicated configuration of the cooling circuits, or deterioration in mountability.

In hybrid vehicles, when the vehicle interior is intended to be heated using waste heat from an engine or a power-train device as a heat source, the heat is often insufficient, failing to adequately heat the interior.

As a countermeasure for this, vehicles with heat pump cycles mounted have also been developed. This technique uses the heat-pump cycle to absorb heat from the outside air, thereby heating the vehicle interior. Such a technique, however, dissipates waste heat from the engine or power-train device into the outside air without using the waste heat for heating, and thus has a problem that the heat cannot be efficiently used.

Note that Patent Document 1 discloses a thermal controller for a vehicle that can switch and circulate the coolants for two systems with respect to a motor generator and an inverter.

RELATED ART DOCUMENT

Patent Document

[Patent Document 1] Japanese Unexamined Patent Application Publication No. 2013-180723

SUMMARY OF INVENTION

The present applicant has previously proposed in Japanese Patent Application No. 2012-118357 (hereinafter referred to as a prior-application example), a thermal management system for a vehicle that effectively utilizes heat by switching and circulating the coolants for the two systems through a number of devices.

In the prior-application example, the heat in the motor generator, inverter, battery, air conditioning for the vehicle interior, and the like can be comprehensively managed to be used effectively.

The technique in the prior-application example includes: a switching valve for switching the flows of coolants for the two systems with respect to a number of devices; two pumps for individually circulating the coolants for the two systems; and a refrigeration cycle for cooling a heat medium in one system while heating a heat medium in the other system.

In the prior-application example, immediately after commencing travel in winter, many devices require warming up, including the battery and the engine. For example, generally, to warm up the battery, 2 to 4 kW of power is needed, while to warm up of the engine, 10 kW or more of power is needed. In winter, to heat the vehicle interior, 3 to 6 kW of power is required. From this aspect, when intended to meet all requirements for warming-up and air-heating, the refrigeration cycle is required to have a heating capacity of 15 to 20 kW or more, that is, the refrigeration cycle with a larger capacity.

The present disclosure has been made in view of the foregoing matter, and it is an object of the present disclosure to reduce a required heating capacity for a refrigeration cycle, in a thermal management system for a vehicle that warms up a plurality of devices using the heating capacity of the refrigeration cycle.

A thermal management system for a vehicle according to an aspect of the present disclosure includes: a first pump and a second pump which are adapted to draw and discharge a heat medium; a compressor adapted to draw and discharge a refrigerant; a heat-medium heating heat exchanger that heats the heat medium by exchanging heat between the refrigerant discharged from the compressor and the heat medium drawn into and discharged from the second pump; a decompressor that decompresses and expands the refrigerant flowing out of the heat-medium heating heat exchanger; a heat-medium cooling heat exchanger that cools the heat medium by exchanging heat between the refrigerant decompressed and expanded by the decompressor and the heat medium drawn into and discharged from the first pump; a heat medium-outside air heat exchanger that exchanges heat between the heat medium cooled by the heat-medium cooling heat exchanger and outside air; an air heating heat exchanger that heats ventilation air into a vehicle interior by exchanging sensible heat between the heat medium heated by the heat-medium heating heat exchanger and the ventilation air; an engine heat transfer portion that transfers heat between an engine outputting a traveling driving force and the heat medium; a battery heat transfer portion that transfers heat between a battery supplying electric power to a traveling electric motor and the heat medium; a switching device that switches between a state in which the heat medium circulates through the heat-medium heating heat exchanger and a state in which the heat medium does not circulate through the heat-medium heating heat exchanger with respect to each of the engine heat transfer portion and the battery heat transfer portion; and a controller. The controller controls the switching device (i) to set a battery warming-up state in which the heat medium circulates between the battery heat transfer portion and the heat-medium heating heat exchanger while the heat medium does not circulate between the engine heat transfer portion and the heat-medium heating heat exchanger when both the battery and engine need to be warmed up; and (ii) to set an engine warming-up state in which the heat medium circulates between the engine heat transfer portion and the heat-medium heating heat exchanger while the heat medium does not circulate between the battery heat transfer portion and the heat-medium heating heat exchanger when a temperature of the battery exceeds a target battery warming-up temperature in the battery warming-up state.

With this arrangement, when both the battery and engine need to be warmed up, the battery is warmed up in priority to warming-up of the engine. Thus, the required heating capacity for the refrigeration cycle can be reduced, compared to the case in which the battery is warmed up at the same time as warming-up of the engine.

Moreover, the warming-up of the battery takes priority, which can quickly ensure the input and output characteristics of the battery, thus enhancing the operating rate of the traveling electric motor, further improving the fuel efficiency of the engine.

DESCRIPTION OF EMBODIMENTS

Figure 1:
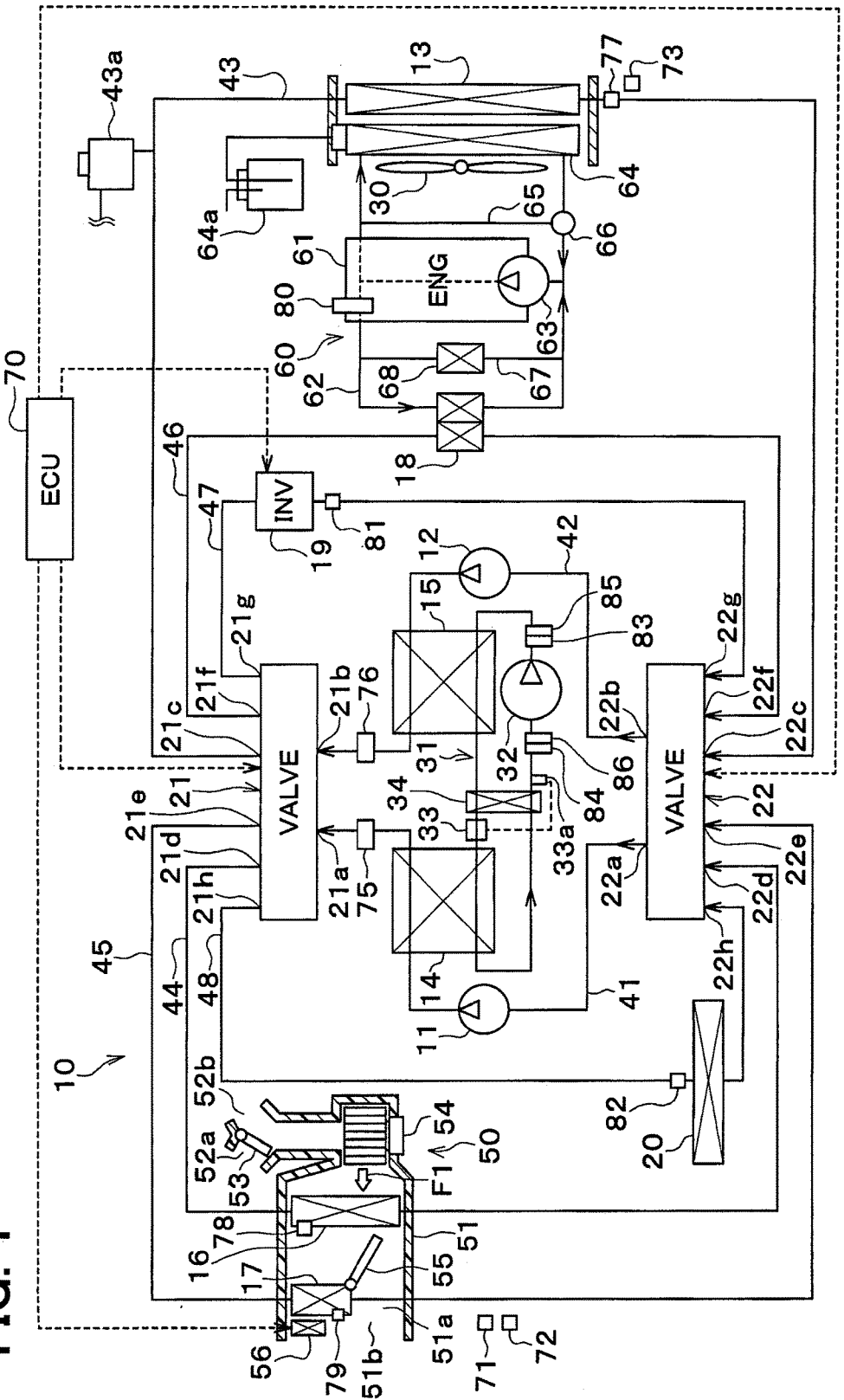
FIG. 1 is an entire configuration diagram of a vehicle thermal management system according to one embodiment.

In the following, an embodiment will be described with reference to the accompanying drawings. A vehicle thermal management system 10 shown in FIG. 1 is used to adjust various devices mounted on a vehicle or an interior of the vehicle to an appropriate temperature. In this embodiment, the thermal management system 10 is applied to a hybrid vehicle that can obtain the driving force for traveling of the vehicle from both an engine (internal combustion engine) and an electric motor for traveling (motor generator).

The hybrid car of this embodiment is configured as a plug-in hybrid vehicle that can charge the battery (vehicle-mounted battery) mounted on the vehicle, with power supplied from an external power source (commercial power source) during stopping of the vehicle. For example, a lithium ion battery can be used as the battery.

The driving force output from the engine is used not only as a driving force for traveling of the vehicle, but also as a force for operating a generator. Power generated by the generator and power supplied from an external power source can be stored in the battery. The battery can also store the power regenerated (regenerated energy) by the electric motor for traveling during deceleration or descending a slope.

The power stored in the battery is supplied not only to the electric motor for traveling, but also to various vehicle-mounted devices, such as electric components included in the thermal management system 10.

The plug-in hybrid vehicle is brought into an EV traveling mode when the state of charge SOC of the battery is equal to or more than a prescribed traveling reference remaining level upon start of traveling by previously charging the battery with power from the external power source during stopping of the vehicle before the start-up of the traveling. The EV traveling mode is a traveling mode in which the vehicle travels by the driving force output from the traveling electric motor.

On the other hand, when the state of charge SOC of the battery is lower than the traveling reference remaining level during traveling, the vehicle is brought into an HV traveling mode. The HV traveling mode is a traveling mode in which the vehicle travels by the driving force output mainly from the engine 61. If the load on traveling vehicle becomes high, the traveling electric motor is operated to assist the engine 61.

The plug-in hybrid vehicle of this embodiment switches between the EV traveling mode and the HV traveling mode in this way to suppress the consumption of fuel of the engine 61 to improve the fuel efficiency of the vehicle, as compared to the normal vehicles that can obtain the driving force for traveling only from the engine 61. Switching between the EV traveling mode and the HV traveling mode is controlled by a driving force controller (not shown).

As shown in FIG. 1, the thermal management system 10 includes a first pump 11, a second pump 12, a radiator 13, a coolant cooler 14, a coolant heater 15, a cooler core 16, a heater core 17, a coolant-coolant heat exchanger 18, an inverter 19, a battery-temperature adjustment heat exchanger 20, a first switching valve 21, and a second switching valve 22.

Each of the first pump 11 and the second pump 12 is an electric pump for drawing and discharging the coolant (heat medium). The coolant is a fluid as the heat medium. In this embodiment, a liquid containing at least ethylene glycol, dimethylpolysiloxane, or a nanofluid, or an antifreezing solution is used as the coolant.

The radiator 13, the coolant cooler 14, the coolant heater 15, the cooler core 16, the heater core 17, the coolant-coolant heat exchanger 18, the inverter 19, and the battery-temperature adjustment 20 are coolant circulation devices (heat-medium circulation devices) through which the coolant circulates.

The radiator 13 is a coolant-outside air heat exchanger (heat medium-outside air heat exchanger) that exchanges heat (sensible heat exchange) between the coolant and the vehicle exterior air (hereinafter referred to as the outside air). The coolant at a temperature equal to or higher than the outside air temperature is allowed to flow through the radiator 13, thereby enabling heat dissipation from the coolant into the outside air. The coolant at a temperature equal to or lower than the outside air temperature is allowed to flow through the radiator 13, thereby enabling heat absorption from the outside air into the coolant. In other words, the radiator 13 can exhibit the function of a radiator that dissipates heat from the coolant into the outside air, and the function of a heat sink that absorbs heat into the coolant from the outside air.

The radiator 13 is a heat transfer device that has a flow path through which the coolant circulates and transfers heat with the coolant having its temperature adjusted by the coolant cooler 14 or coolant heater 15.

An exterior blower 30 is an electric blower (outside-air blower) that blows the outside air to the radiator 13. The radiator 13 and the exterior blower 30 are disposed at the forefront of the vehicle. Thus, during traveling of the vehicle, the radiator 13 can face the traveling air.

Each of the coolant cooler 14 and the coolant heater 15 is a coolant-temperature adjustment heat exchanger (heat-medium temperature adjustment heat exchanger) that adjusts the temperature of coolant by exchanging heat with coolant. The coolant cooler 14 is a coolant-cooling heat exchanger (heat-medium cooling heat exchanger) for cooling the coolant. The coolant heater 15 is a coolant-heating heat exchanger (heat-medium heating heat exchanger) for heating the coolant.

The coolant cooler 14 is a low-pressure side heat exchanger (heat-medium heat sink) that absorbs heat in the low-pressure side refrigerant from the coolant by exchanging heat between the coolant and a low-pressure side refrigerant of a refrigeration cycle 31. The coolant cooler 14 serves as an evaporator of the refrigeration cycle 31.

The refrigeration cycle 31 is a vapor-compression refrigerator that includes a compressor 32, the coolant heater 15, an expansion valve 33, the coolant cooler 14, and an internal heat exchanger 34. The refrigeration cycle 31 of this embodiment forms a subcritical refrigeration cycle in which a high-pressure side refrigerant pressure does not exceed the critical pressure of the refrigerant, using a fluorocarbon refrigerant as the refrigerant.

The compressor 32 is an electric compressor driven by power supplied from the battery. The compressor 32 draws and compresses the refrigerant in the refrigeration cycle 31 and discharges the compressed refrigerant therefrom.

The coolant heater 15 is a condenser that condenses (changes a latent heat of) a high-pressure side refrigerant by exchanging heat between the high-pressure side refrigerant discharged from the coolant and the compressor 32.

The expansion valve 33 is a decompression device that decompresses and expands a liquid-phase refrigerant flowing out of the coolant heater 15. The expansion valve 33 is a thermal expansion valve that has a temperature sensor 33a for detecting the superheat degree of the refrigerant on the outlet side of the coolant heater 15 based on the temperature and pressure of the refrigerant on the outlet side of the coolant heater 15. The expansion valve 33 is adapted to adjust a throttle passage area by a mechanical mechanism such that the superheat degree of the refrigerant on the outlet side of the evaporator 22 is within a predetermined range previously set.

The coolant cooler 14 is an evaporator that evaporates (changes a latent heat of) a low-pressure refrigerant by exchanging heat between the coolant and the low-pressure refrigerant decompressed and expanded by the expansion valve 33. The gas-phase refrigerant evaporated at the coolant cooler 14 is drawn into and compressed by the compressor 32.

The internal heat exchanger 34 is a heat exchanger that exchanges heat between the refrigerant flowing out of the coolant heater 15 and the refrigerant flowing out of the coolant cooler 14.

The refrigeration cycle 31 is a coolant cooling-heating portion (heat medium cooling-heating portion) that has the coolant cooler 14 for cooing the coolant and the coolant heater 15 for heating the coolant. In other words, the refrigeration cycle 31 serves as a low-temperature coolant generator (low-temperature heat-medium generator) that generates a low-temperature coolant at the coolant cooler 14, and also as a high-temperature coolant generator (high-temperature heat-medium generator) that generates a high-temperature coolant at the coolant heater 15.

The radiator 13 serves to cool the coolant by the outside air, while the coolant cooler 14 serves to cool the coolant by the low-pressure refrigerant in the refrigeration cycle 31. Thus, the temperature of the coolant cooled by the coolant cooler 14 can be made lower than that of the coolant cooled by the radiator 13. Specifically, the radiator 13 cannot cool the coolant to a temperature lower than that of the outside air, whereas the coolant cooler 14 can cool the coolant to a temperature lower than that of the outside air.

The cooler core 16 and the heater core 17 are heat medium-air heat exchangers that exchange heat between the coolant having its temperature adjusted by the coolant cooler 14 and the coolant heater 15 and ventilation air to be blown into the vehicle interior, thereby adjusting the temperature of the ventilation air.

The cooler core 16 is an air cooling heat exchanger that cools ventilation air into the vehicle interior by exchanging heat (exchanging sensible heat) between the coolant and the ventilation air into the vehicle interior. The heater core 17 is an air heating heat exchanger that heats ventilation air into the vehicle interior by exchanging heat (exchanging sensible heat) between the coolant and the ventilation air into the vehicle interior.

The coolant-coolant heat exchanger 18, the inverter 19, and the battery-temperature adjustment heat exchanger 20 are heat transfer devices (temperature-adjustment target devices) that have flow paths for circulation of the coolant and transfer heat with the coolant.

The coolant-coolant heat exchanger 18 is a heat exchanger (heat medium-heat medium heat exchanger) that exchanges heat between the coolant in the vehicle thermal management system 10 (the coolant circulating by the first pump 11 or second pump 12) and the coolant (engine heat medium) in an engine cooling circuit 60.

The coolant-coolant heat exchanger 18 constitutes an engine heat transfer portion that transfers heat between an engine 61 and the coolant allowed to circulate by the first pump 11 or second pump 12.

The inverter 19 is a power converter that converts a direct-current (DC) power supplied from the battery into an alternating-current (AC) voltage to output the AC voltage to the traveling electric motor. The inverter 19 is a heat generator that generates heat during its operation. The amount of heat generated by the inverter 19 changes depending on the traveling state of the vehicle. The coolant flow path in the inverter 19 serves as a device heat transfer portion that transfers heat between the heat generator and the coolant.

The battery-temperature adjustment heat exchanger 20 is a heat exchanger (heat medium-air heat exchanger) disposed in a ventilation-air route to the battery and adapted to exchange heat between the ventilation air and the coolant. The battery-temperature adjustment heat exchanger 20 constitutes a battery heat transfer portion that transfers heat between the battery and the coolant.

The first pump 11 is disposed in a first-pump flow path 41. The coolant cooler 14 is disposed on the discharge side of the first pump 11 in the first-pump flow path 41.

The second pump 12 is disposed in a second-pump flow path 42. The coolant heater 15 is disposed on the discharge side of the second pump 12 in the second-pump flow path 42.

The radiator 13 is disposed in a radiator flow path 43. The cooler core 16 is disposed in a cooler-core flow path 44. The heater core 17 is disposed in a heater-core flow path 45.

The coolant-coolant heat exchanger 18 is disposed in a coolant-cooler heat exchanger flow path 46. The inverter 19 is disposed in an inverter flow path 47. The battery-temperature adjustment heat exchanger 20 is disposed in a battery heat exchange flow path 48.

A reserve tank 43a is connected to the radiator flow path 43. The reserve tank 43a is an air release container (heat medium reservoir) for storing the coolant therein. Thus, the pressure at the liquid surface of the coolant stored in the reserve tank 43a becomes atmospheric pressure.

The reserve tank 43a may be configured such that the pressure at the liquid surface of the coolant stored therein becomes a predetermined pressure (pressure different from the atmospheric pressure).

Excessive coolant is stored in the reserve tank 43a, which can suppress the decrease in liquid amount of the coolant circulating through the respective flow paths. The reserve tank 43a has a function of separating the air bubbles contained in the coolant, into gas and liquid.

The first-pump flow path 41, the second-pump flow path 42, the radiator flow path 43, the cooler core flow path 44, the heater-core flow path 45, the coolant-coolant heat exchanger flow path 46, the inverter flow path 47, and the battery heat exchange flow path 48 are connected to the first switching valve 21 and the second switching valve 22. Each of the first and second switching valves 21 and 22 is a switching device that switches the flow of the coolant (coolant circulation state).

The first switching valve 21 has a first inlet 21a and a second inlet 21b as coolant inlets, a first outlet 21c, a second outlet 21d, a third outlet 21e, a fourth outlet 21f, a fifth outlet 21g, and a sixth outlet 21h as coolant outlets.

The second switching valve 22 has a first outlet 22a and a second outlet 22b as the coolant outlets, and a first inlet 22c, a second inlet 22d, a third inlet 22e, a fourth inlet 22f, a fifth inlet 22g, and a sixth inlet 22h as the coolant inlets.

The first inlet 21a of the first switching valve 21 is connected to one end of the first-pump flow path 41. In other words, the first inlet 21a of the first switching valve 21 is connected to the coolant outlet side of the coolant cooler 14.

The second inlet 21b of the first switching valve 21 is connected to one end of the second-pump flow path 42. In other words, the second inlet 21b of the first switching valve 21 is connected to the coolant outlet side of the coolant heater 15.

The first outlet 21c of the first switching valve 21 is connected to one end of the radiator flow path 43. In other words, the first outlet 21c of the first switching valve 21 is connected to the coolant inlet side of the radiator 13.

The second outlet 21d of the first switching valve 21 is connected to one end of the cooler-core flow path 44. In other words, the second outlet 21d of the first switching valve 21 is connected to the coolant inlet side of the cooler core 16.

The third outlet 21e of the first switching valve 21 is connected to one end of the heater-core flow path 45. In other words, the third outlet 21e of the first switching valve 21 is connected to the coolant inlet side of the heater core 17.

The fourth outlet 21f of the first switching valve 21 is connected to one end of the coolant-coolant heat exchanger flow path 46. In other words, the fourth outlet 21f of the first switching valve 21 is connected to the coolant inlet side of the coolant-coolant heat exchanger 18.

The fifth outlet 21g of the first switching valve 21 is connected to one end of the inverter flow path 47. In other words, the fifth outlet 21g of the first switching valve 21 is connected to the coolant inlet side of the inverter 19.

The sixth outlet 21h of the first switching valve 21 is connected to one end of the battery heat exchange flow path 48. In other words, the fifth outlet 21g of the first switching valve 21 is connected to the coolant inlet side of the battery-temperature adjustment heat exchanger 20.

The first outlet 22a of the second switching valve 22 is connected to the other end of the first-pump flow path 41. In other words, the first outlet 22a of the second switching valve 22 is connected to the coolant suction side of the first pump 11.

The second outlet 22b of the second switching valve 22 is connected to the other end of the second-pump flow path 42. In other words, the second outlet 22b of the second switching valve 22 is connected to the coolant suction side of the second pump 12.

The first inlet 22c of the second switching valve 22 is connected to the other end of the radiator flow path 43. In other words, the first inlet 22c of the second switching valve 22 is connected to the coolant outlet side of the radiator 13.

The second inlet 22d of the second switching valve 22 is connected to the other end of the cooler-core flow path 44. In other words, the second inlet 22d of the second switching valve 22 is connected to the coolant outlet side of the cooler core 16.

The third inlet 22e of the second switching valve 22 is connected to the other end of the heater-core flow path 45. In other words, the third inlet 22e of the second switching valve 22 is connected to the coolant outlet side of the heater core 17.

The fourth inlet 22f of the second switching valve 22 is connected to the other end of the coolant-coolant heat exchanger flow path 46. In other words, the fourth inlet 22f of the second switching valve 22 is connected to the coolant outlet side of the coolant-coolant heat exchanger 18.

The fifth inlet 22g of the second switching valve 22 is connected to the other end of the inverter flow path 47. In other words, the fifth inlet 22g of the second switching valve 22 is connected to the coolant outlet side of the inverter 19.

The sixth inlet 22h of the second switching valve 22 is connected to the other end of the battery heat exchange flow path 48. In other words, the fifth inlet 22g of the second switching valve 22 is connected to the coolant outlet side of the battery-temperature adjustment heat exchanger 20.

The first switching valve 21 and the second switching valve 22 can be configured to arbitrarily or selectively switch the communication states between each inlet and outlet.

Specifically, the first switching valve 21 switches among a state in which the coolant discharged from the first pump 11 flows, a state in which the coolant discharged from the second pump 12 flows, and a state in which the coolant discharged from the first pump 11 and the coolant discharged from the second pump 12 do not flow, with respect to each of the radiator 13, the cooler core 16, the heater core 17, the coolant-coolant heat exchanger 18, the inverter 19, and the battery-temperature adjustment heat exchanger 20.

The second switching valve 22 switches among a state in which the coolant flows out to the first pump 11, a state in which the coolant flows out to the second pump 12, and a state in which the coolant does not flow to the first pump 11 and the second pump 12, with respect to each of the radiator 13, the cooler core 16, the heater core 17, the coolant-coolant heat exchanger 18, the inverter 19, and the battery-temperature adjustment heat exchanger 20.

The first switching valve 21 and the second switching valve 22 are capable of adjusting their valve opening degrees. In this way, the first and second switching valves 21 and 22 can adjust the flow rates at which the coolant flows through the radiator 13, the cooler core 16, the heater core 17, the coolant-coolant heat exchanger 18, the inverter 19, and the battery-temperature adjustment heat exchanger 20.

That is, the first switching valve 21 and the second switching valve 22 are flow-rate adjustment portions that adjust the flow rate of the coolant for each of the radiator 13, the cooler core 16, the heater core 17, the coolant-coolant heat exchanger 18, the inverter 19, and the battery-temperature adjustment heat exchanger 20.

The first switching valve 21 is capable of mixing the coolant discharged from the first pump 11 and the coolant discharged from the second pump 12 at any flow-rate ratio, thereby allowing the mixed coolant to flow into the radiator 13, the cooler core 16, the heater core 17, the coolant-coolant heat exchanger 18, the inverter 19, and the battery-temperature adjustment heat exchanger 20.

That is, the first switching valve 21 and the second switching valve 22 serve as flow-rate ratio adjustment portions for adjusting the flow-rate ratio of the coolant cooled by the coolant cooler 14 to that heated by the coolant heater 15 with respect to each of the radiator 13, the cooler core 16, the heater core 17, the coolant-coolant heat exchanger 18, the inverter 19, and the battery-temperature adjustment heat exchanger 20.

The cooler core 16 and the heater core 17 are accommodated in a casing 51 of an interior air-conditioning unit 50 in the vehicle air conditioner.

The casing 51 forms an air passage for ventilation air to be blown into the vehicle interior. The casing 51 is formed of resin (for example, polypropylene) with some elasticity and excellent strength. An inside/outside air switching case 52 is disposed at the most upstream side of air flow in the casing 51. The inside/outside air switching case 52 is an inside/outside air introduction portion that switches between the inside air (air in a vehicle compartment) and the outside air (air outside the vehicle compartment) to introduce the switched air.

The inside/outside air switching case 52 has an inside-air suction port 52*a* for introducing the inside air into the casing 51, and an outside-air suction port 52*b* for introducing the outside air into the casing 51. An inside/outside air switching door 53 is disposed inside the inside/outside air switching case 52.

The inside/outside air switching door 53 serves as an air volume ratio changing portion for changing the ratio of the volume of inside air to that of outside air to be introduced into the casing 51. Specifically, the inside/outside air switching door 53 continuously adjusts the opening areas of an inside-air suction port 52*a* and the outside-air suction port 52*b*, thereby changing the ratio of the volume of the inside air to that of the outside air. The inside/outside air switching door 53 is driven by an electric actuator (not shown).

An interior blower (blower) 54 is disposed downstream of the air flow in the inside/outside air switching case 52. The interior blower 54 blows air (inside air and outside air) drawn via the inside/outside air switching case 52, into the vehicle interior. The interior blower 54 is an electric blower that includes a centrifugal multiblade fan (sirocco fan) to be driven by an electric motor.

The cooler core 16, the heater core 17, and an auxiliary heater 56 are disposed on the downstream side of the air flow from the interior blower 54 in the casing 51. The auxiliary heater 56 has a PTC element (positive thermistor), and is a PTC heater (electric heater) that heats the air by generating heat through supply of the electric power to the PTC element.

A heater-core bypass passage 51*a* is formed at the downstream side part of the air flow through the cooler core 16 within the casing 51. The heater-core bypass passage 51*a* is an air passage that allows the air passing through the cooler core 16 to flow without causing the air to pass through the heater core 17 and the auxiliary heater 56.

An air mix door 55 is disposed in between the cooler core 16 and the heater core 17 within the casing 51.

The air mix door 55 serves as an air volume-ratio adjuster that continuously changes the ratio of the volume of the air flowing into the heater core 17 and the auxiliary heater 56 to that of the air flowing into the heater-core bypass passage 51*a*. The air mix door 55 is, for example, a revolving plate-shaped door, a slidable door, or the like, and driven by an electric actuator (not shown).

The temperature of blowout air to be blown into the vehicle interior is changed by the ratio of the volume of the air passing through the heater core 17 and the auxiliary heater 56 to that of the air passing through the heater-core bypass passage 51*a*. Thus, the air mix door 55 serves as a temperature adjustment portion adapted to adjust the temperature of the blowout air to be blown into the vehicle interior.

An air outlet 51*b* for blowing the ventilation air into the vehicle interior as a space to be air-conditioned is disposed on the most downstream side of the air flow in the casing 51. The air outlet 51*b* specifically includes a defroster air outlet, a face air outlet, and a foot air outlet.

The defroster air outlet blows the conditioned air toward the inner side of a windshield of the vehicle. The face air outlet blows the conditioned air toward the upper body of an occupant. The foot air outlet blows the conditioned air toward the feet of the occupant.

An air-outlet mode door (not shown) is disposed on the upstream side of the air flow in the air outlet 51*b*. The air-outlet mode door serves as an air-outlet mode switch for switching the air outlet mode. The air-outlet mode door is driven by the electric actuator (not shown).

The air-outlet modes switched by the air-outlet mode door include, for example, a face mode, a bi-level mode, a foot mode, and a foot-defroster mode.

The face mode is the air outlet mode in which the face air outlet is fully opened to blow the air from the face air outlet toward the upper body of the occupant in the vehicle compartment. The bi-level mode is the air outlet mode in which both the face air outlet and foot air outlet are opened to blow air toward the upper body and feet of the occupant in the vehicle compartment.

The foot mode is the air outlet mode in which the foot air outlet is fully opened with the defroster air outlet opened only by a small opening degree to blow the air mainly from the foot air outlet. The foot-defroster mode is the air outlet mode in which the foot air outlet and the defroster air outlet are opened by the same degree to blow the air from both the foot air outlet and the defroster air outlet.

The engine cooling circuit 60 is a coolant circulation circuit for cooling the engine 61. The engine cooling circuit 60 includes a circulation flow path 62 that allows circulation of the coolant. The circulation flow path 62 is provided with the engine 61, an engine pump 63, an engine radiator 64, and the coolant-coolant heat exchanger 18.

The engine pump 63 is an electric pump that draws and discharges the coolant. The engine pump 63 may be a mechanical pump driven by a power output from the engine 61.

The engine radiator 64 is a heat exchanger for heat dissipation (heat medium-air heat exchanger) that dissipates heat of the coolant into the outside air by exchanging heat between the coolant and the outside air.

The circulation flow path 62 is connected to a radiator bypass flow path 65. The radiator bypass flow path 65 is a flow path through which the coolant flows while bypassing the engine radiator 64.

A thermostat 66 is disposed in a connection portion between the radiator bypass flow path 65 and the circulation flow path 62. The thermostat 66 is a coolant-temperature responsive valve constructed of a mechanical mechanism that is designed to open and close a coolant flow path by displacing a valve body using a thermo wax (temperature sensing member) whose volume changes in response to the temperature.

Specifically, when the temperature of coolant exceeds a predetermined temperature (for example, 80° C. or higher), the thermostat 66 closes the radiator bypass flow path 65. When the temperature of coolant is lower than the predetermined temperature (for example, less than 80° C.), the thermostat 66 opens the radiator bypass flow path 65.

The circulation flow path 62 is connected to an engine-accessory flow path 67. The engine-accessory flow path 67 is a flow path in which the coolant flows in parallel with the coolant-coolant heat exchanger 18. Engine accessories 68 are disposed in the engine-accessory flow path 67. The engine accessories 68 include an oil heat exchanger, an exhaust gas recirculation (EGR) cooler, a throttle cooler, a turbo cooler, an engine-accessory motor, and the like. The oil heat exchanger is a heat exchanger that adjusts the temperature of oil by exchanging heat between the coolant and the engine oil or transmission oil.

The EGR cooler is a heat exchanger constituting an EGR (exhaust gas recirculation) device that refluxes part of exhaust gas from the engine onto the intake side to reduce pumping loss caused by a throttle valve. Specifically, the EGR cooler is the heat exchanger that exchanges heat between reflux gas and the coolant to thereby adjust the temperature of the reflux gas.

The throttle cooler is a water jacket provided in the throttle to cool the throttle valve.

The turbo cooler is a cooler that cools a turbo charger by exchanging heat between heat generated by the turbo charger and the coolant.

The engine auxiliary motor is a large-sized motor for rotating an engine belt even during stopping of the engine. The engine auxiliary motor is used to operate the compressor or water pump, which is driven by the engine belt, even when no driving force is available from the engine, or used upon start-up of the engine.

An engine reserve tank 64a is coupled to the engine radiator 64. The structure and function of the engine reserve tank 64a are the same as those of the above-mentioned reserve tank 43a.

Figure 2:
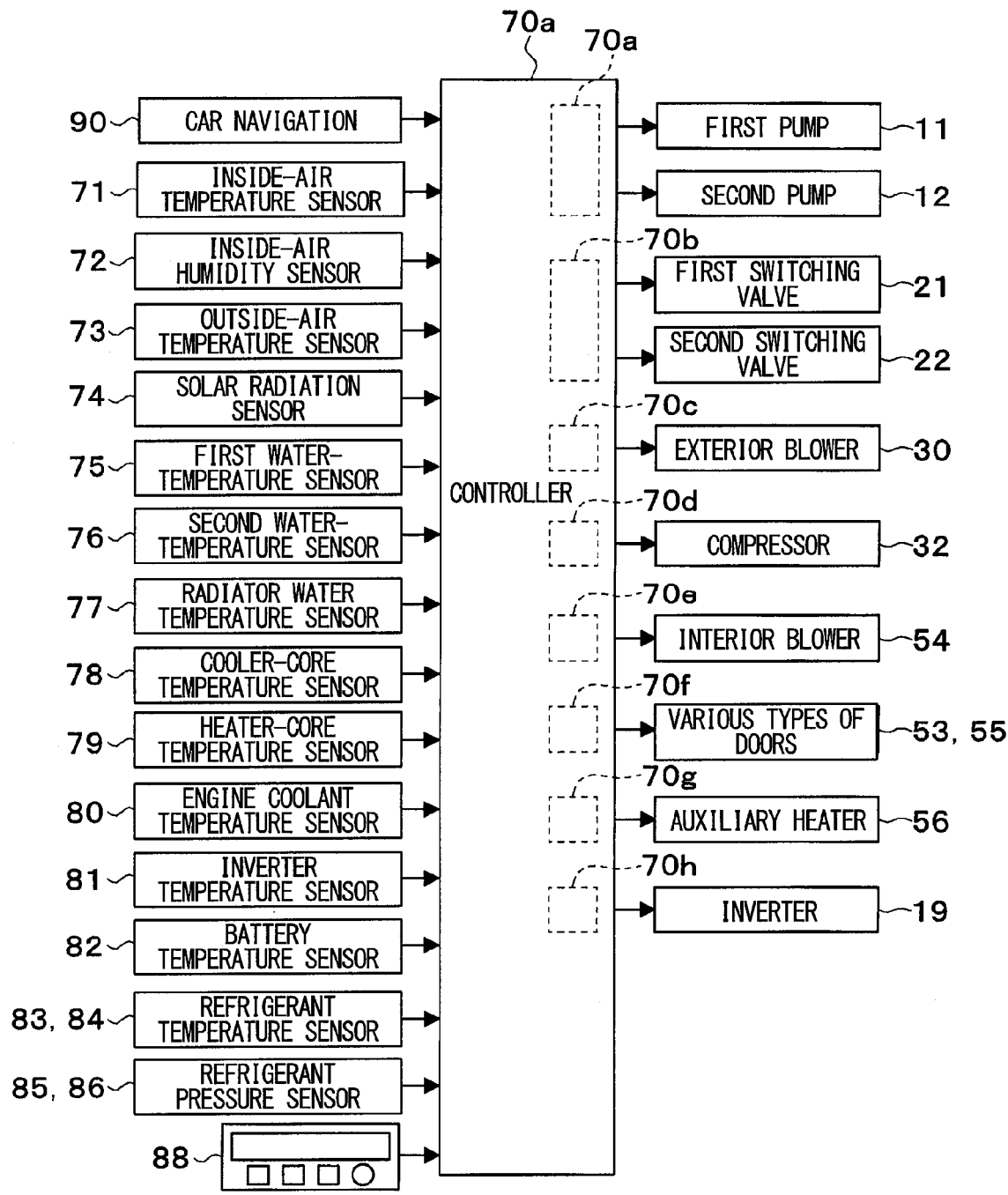
FIG. 2 is a block diagram showing an electric controller in the vehicle thermal management system in the one embodiment.

Now, an electric controller of the thermal management system 10 will be described with reference to FIG. 2. A controller 70 is comprised of a known microcomputer, including a CPU, a ROM, and a RAM, and a peripheral circuit thereof. The controller performs various computations and processing based on air-conditioning control programs stored in the ROM to thereby control the operations of various control target devices that are connected to its output side.

The control target devices that are to be controlled by the controller 70 include the first pump 11, the second pump 12, the first switching valve 21, the second switching valve 22, the exterior blower 30, the compressor 32, the interior blower 54, the electric actuator for driving various doors (inside/outside air switching door 53, air mix door 55, air-outlet mode door, and the like) disposed in the casing 51, and the inverter 19.

The controller 70 is integrally structured with a control unit for controlling various control target devices connected to the output side of the controller. A structure (hardware and software) adapted to control the operation of each of the control target devices serves as the control unit for controlling the operations of the control target devices.

In this embodiment, the structure (hardware and software) that controls the operations of the first pump 11 and the second pump 12 is configured as a pump control unit 70a in the controller 70. The pump control unit 70a is a flow-rate control unit (heat-medium flow-rate adjustment portion) for controlling the flow rate of coolant flowing through the respective coolant-circulation devices.

In this embodiment, the structure (hardware and software) that controls the operations of the first switching valve 21 and the second switching valve 22 is configured as a switching valve control unit 70b in the controller 70. The switching valve control unit 70b is a flow-rate control unit (heat-medium flow-rate adjustment portion) for controlling the flow rate of coolant flowing through the respective coolant-circulation devices.

In this embodiment, the structure (hardware and software) that controls the operation of the exterior blower 30 is configured as an exterior blower control unit 70c (outside-air blower control unit) in the controller 70. The exterior blower control unit 70c is a radiator adjustment portion (outside-air flow-rate adjustment portion) that controls the flow rate of outside air flowing through the radiator 13.

In this embodiment, the structure (hardware and software) that controls the operation of the compressor 32 is configured as a compressor control unit 70d in the controller 70. The compressor control unit 70d is a refrigerant flow-rate adjustment portion that controls the flow rate of refrigerant discharged from the compressor 32.

In this embodiment, the structure (hardware and software) that controls the operation of the interior blower 54 is configured as an interior blower control unit 70e in the controller 70. The interior blower 54 and the interior blower control unit 70e serve as a volume control unit for controlling the volume of ventilation air to be blown into the vehicle interior.

In this embodiment, the structure (hardware and software) that controls the operations of various doors disposed in the casing 51 (inside/outside air switching door 53, air mix door 55, air-outlet mode door, and the like) is configured as an air-conditioning switching control unit 70f in the controller 70.

The air mix door 55 and the air-conditioning switching control unit 70f serve as the air-volume ratio adjustment portion that adjusts the ratio of the volume of the ventilation air flowing through the heater core 17 to that of the ventilation air bypassing the heater core 17, in all the ventilation air cooled by the cooler core 16.

The inside/outside air switching door 53 and the air-conditioning switching control unit 70f serve as an inside/outside air ratio adjustment portion that adjusts the ratio of the inside air to the outside air in the ventilation air to be blown into the vehicle interior.

In this embodiment, the structure (hardware and software) that controls the operation of the auxiliary heater 56 is configured as an auxiliary heater control unit 70g (electric heater control unit) in the controller 70.

In this embodiment, the structure (hardware and software) that controls the operation of the inverter 19 is configured as an inverter control unit 70h (heat generator control unit) in the controller 70.

The above-mentioned respective control units 70a, 70b, 70c, 70d, 70e, 70f, 70g, and 70h may be configured of separated members for the controller 70.

Detection signals from a group of sensors are input to the input side of the controller 70. The group of sensors includes a car navigation system 90, an inside-air temperature sensor 71, an inside-air humidity sensor 72, an outside-air temperature sensor 73, a solar radiation sensor 74, a first water-temperature sensor 75, a second water-temperature sensor 76, a radiator water temperature sensor 77, a cooler-core temperature sensor 78, a heater-core temperature sensor 79, an engine coolant temperature sensor 80, an inverter temperature sensor 81, a battery temperature sensor 82, refrigerant temperature sensors 83 and 84, and refrigerant pressure sensors 85 and 86.

The car navigation system 90 learns a route plan set and a traveling pattern history. A learning signal output from the car navigation system 90 is input to the controller 70.

The inside-air temperature sensor 71 is a detector (inside-air temperature detector) for detecting the temperature of inside air (or the temperature of air in the vehicle compartment). The inside-air humidity sensor 72 is a detector (inside-air humidity detector) for detecting the humidity of the inside air.

The outside-air temperature sensor 73 is a detector (outside-air temperature detector) for detecting the temperature of outside air (or the temperature of air outside the vehicle compartment). The solar radiation sensor 74 is a detector (solar radiation amount detector) for detecting the amount of solar radiation into the vehicle interior.

The first water temperature sensor 75 is a detector (first heat-medium temperature detector) that detects the temperature of coolant flowing through the first-pump flow path 41 (for example, the temperature of coolant drawn into the first pump 11).

The second water temperature sensor 76 is a detector (second heat-medium temperature detector) that detects the temperature of coolant flowing through the second-pump flow path 42 (for example, the temperature of coolant drawn into the second pump 12).

The radiator water temperature sensor 77 is a detector (device-side heat-medium temperature detector) that detects the temperature of coolant flowing through the radiator flow path 43 (for example, the temperature of coolant flowing out of the radiator 13).

The cooler core temperature sensor 78 is a detector (cooler-core temperature detector) for detecting the surface temperature of the cooler core 16. The cooler-core temperature sensor 78 is, for example, a fin thermistor for detecting the temperature of a heat exchange fin in the cooler core 16, a water-temperature sensor for detecting the temperature of coolant flowing through the cooler core 16, or the like.

The heater-core temperature sensor 79 is a detector (heater-core temperature detector) for detecting the surface temperature of the heater core 17. The heater-core temperature sensor 79 is, for example, a fin thermistor for detecting the temperature of a heat exchange fin in the heater core 17, a water-temperature sensor for detecting the temperature of coolant flowing through the heater core 17, or the like.

The engine coolant temperature sensor 80 is a detector (engine heat-medium temperature detector) that detects the temperature of coolant circulating through the engine cooling circuit 60 (for example, the temperature of coolant flowing through the inside of the engine 61).

The inverter temperature sensor 81 is a detector (device-side heat-medium temperature detector) that detects the temperature of coolant flowing through the inverter flow path 47 (for example, the temperature of coolant flowing out of the inverter 19).

The battery temperature sensor 82 is a detector (device-side heat-medium temperature detector) that detects the temperature of coolant flowing through the battery heat exchange flow path 48 (for example, the temperature of coolant flowing into the battery-temperature adjustment heat exchanger 20). The battery temperature sensor 82 may be a detector (battery typical temperature detector) that detects the temperature of a specific part (battery typical temperature) in a battery pack with fluctuations in temperature.

Refrigerant temperature sensors 83 and 84 are the discharge-side refrigerant temperature sensor 83 that detects the temperature of refrigerant discharged from the compressor 32, and the suction-side refrigerant temperature sensor 84 that detects the temperature of refrigerant drawn into the compressor 32.

For example, refrigerant pressure sensors 85 and 86 are the discharge-side refrigerant pressure sensor 85 that detects the pressure of refrigerant discharged from the compressor 32, and the suction-side refrigerant pressure sensor 86 that detects the pressure of refrigerant drawn into the compressor 32.

An operation panel 88 is provided with various air-conditioning operation switches. Operation signals from the operation switches are input to the input side of the controller 70. For example, the operation panel 88 is disposed near the dashboard at the front of the vehicle compartment.

Various air-conditioning operation switches provided on the operation panel 88 include an air conditioner switch, an automatic switch, an air volume setting switch of the interior blower 52, a vehicle-interior temperature setting switch, an air-conditioning stop switch, and the like.

The air conditioner switch is a switch for switching between operating and stopping (turning on and off) of air cooling or dehumidification. The automatic switch is a switch for setting or resetting automatic control of the air conditioning. The vehicle-interior temperature setting switch serves as target temperature setting portion for setting a target vehicle interior temperature by an occupant's operation. The air-conditioning stop switch is a switch that stops the air conditioning.

The various air-conditioning operation switches provided on the operation panel 88 serve as an air-conditioning requesting portion for requesting the cooler core 16 to cool the ventilation air, and for requesting the heater core 17 to heat the ventilation air.

Next, the operation of the above-mentioned structure will be described. The controller 70 controls the operations of the first pump 11, the second pump 12, the compressor 32, the first switching valve 21, the second switching valve 22, and the like, thereby switching among various operation modes.

For example, a first coolant circuit (first heat-medium circuit) is formed that allows the coolant drawn into and discharged from the first pump 11 to circulate between the coolant cooler 14 and at least one device of the radiator 13, the cooler core 16, the heater core 17, the coolant-coolant heat exchanger 18, the inverter 19, and the battery-temperature adjustment heat exchanger 20. Furthermore, a second coolant circuit (second heat-medium circuit) is formed that allows the coolant drawn into and discharged from the second pump 12 to circulate between the coolant heater 15 and at least one device of the radiator 13, the cooler core 16, the heater core 17, the coolant-coolant heat exchanger 18, the inverter 19, and the battery-temperature adjustment heat exchanger 20.

The thermal management system is switched, depending on the situation, between a state of connecting to the first coolant circuit and a state of connecting to the second coolant circuit with respect to each of the radiator 13, the cooler core 16, the heater core 17, the coolant-coolant heat exchanger 18, the inverter 19, and the battery-temperature adjustment heat exchanger 20. Thus, the radiator 13, the cooler core 16, the heater core 17, the coolant-coolant heat exchanger 18, the inverter 19, and the battery-temperature adjustment heat exchanger 20 can be adjusted to have appropriate temperatures depending on the situation.

When the radiator 13 is connected to the first coolant circuit, the refrigeration cycle 31 can perform a heat-pump operation. That is, in the first coolant circuit, the coolant cooled by the coolant cooler 14 flows through the radiator 13, allowing the coolant to absorb heat from the outside air at the radiator 13.

Then, the coolant having absorbed heat from the outside air at the radiator 13 exchanges heat with the refrigerant in the refrigeration cycle 31 to dissipate heat at the coolant cooler 14. Thus, in the coolant cooler 14, the refrigerant in the refrigeration cycle 31 absorbs heat from outside air via the coolant.

The refrigerant having absorbed heat from the outside air at the coolant cooler 14 exchanges heat with the coolant in the second coolant circuit at the coolant heater 15, thereby dissipating the heat thereat. Thus, the heat pump operation of pumping up the heat from the outside air can be achieved.

When the radiator 13 is connected to the second coolant circuit, the coolant heated by the coolant heater 15 flows through the radiator 13, allowing the coolant to dissipate heat into the outside air at the radiator 13.

When the cooler core 16 is connected to the first coolant circuit, the coolant cooled by the coolant cooler 14 flows through the cooler core 16, allowing the ventilation air into the vehicle interior to be cooled by the cooler core 16. That is, the vehicle interior can be cooled.

When the heater core 17 is connected to the second coolant circuit, the coolant heated by the coolant heater 15 flows through the heater core 17, allowing the ventilation air into the vehicle interior to be heated by the heater core 17. That is, the vehicle interior can be heated.

When the coolant-coolant heat exchanger 18 is connected to the first coolant circuit, the coolant cooled by the coolant cooler 14 flows through the coolant-coolant heat exchanger 18, whereby the engine coolant can be cooled. In other words, the coolant in the first coolant circuit can absorb heat from the engine coolant in the coolant-coolant heat exchanger 18, which can achieve the heat pump operation of pumping up the waste heat from the engine 61.

When the coolant-coolant heat exchanger 18 is connected to the second coolant circuit, the coolant heated by the coolant heater 15 flows through the coolant-coolant heat exchanger 18, whereby the engine coolant can be heated. Thus, the engine 61 can be heated (warmed up).

When the inverter 19 is connected to the first coolant circuit, the coolant cooled by the coolant cooler 14 flows through the inverter 19, thereby enabling cooling of the inverter 19. In other words, the heat pump operation of pumping up the waste heat from the inverter 19 can be achieved.

When the inverter 19 is connected to the second coolant circuit, the coolant heated by the coolant heater 15 flows through the inverter 19, thereby enabling heating (warming up) of the inverter 19.

When the battery-temperature adjustment heat exchanger 20 is connected to the first coolant circuit, the coolant cooled by the coolant cooler 14 flows through the battery-temperature adjustment heat exchanger 20, thereby enabling cooling of the battery. In other words, the heat pump operation of pumping up the waste heat from the battery can be achieved.

When the battery-temperature adjustment heat exchanger 20 is connected to the second coolant circuit, the coolant heated by the coolant heater 15 flows through the battery-temperature adjustment heat exchanger 20, thereby enabling heating (warming up) of the battery.

Figure 3:
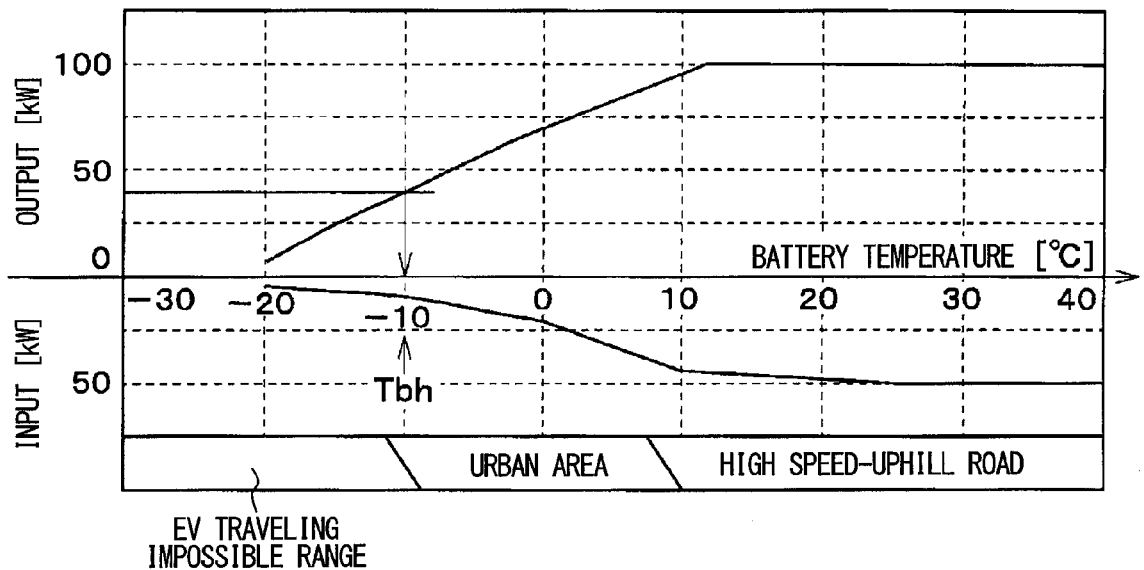
FIG. 3 is a graph showing the relationship between the temperature and input-output characteristics of a battery in the one embodiment.

As shown in FIG. 3, when a battery is at a low temperature, the input and output characteristics will be worsened, whereas when a battery is at a high temperature, the degradation in the battery will be accelerated. To make the most of the input and output characteristics of the battery, it is necessary to manage the temperature of the battery within a certain temperature range (generally, of 10 to 40° C.).

Once the temperature of the battery deviates from the appropriate temperature range, the output of the battery is reduced, making the comfort of driving worse or degrading the input characteristics of the battery, which fails to sufficiently recover the regenerated energy, resulting in reduced EV traveling distance.

In general, the battery is designed such that the vehicle can travel in an urban area even if the temperature of the battery is decreased to −10° C.

Figure 4:
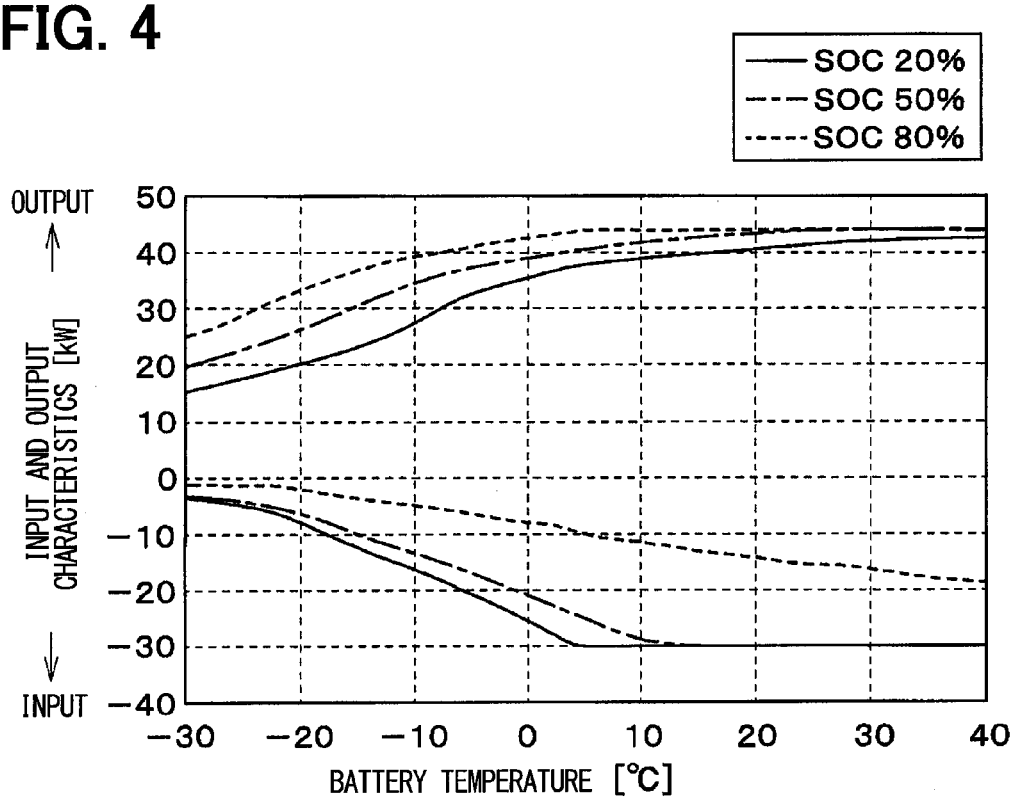
FIG. 4 is a graph showing the relationship between the state of charge and input-output characteristics of a battery in the one embodiment.

As shown in FIG. 4, as the state of charge SOC of the battery is higher (approaching the full charge), the battery has a larger output, but a smaller input (regeneration). Conversely, as the state of charge SOC of the battery is lower, the battery has a smaller output, but a larger input (regeneration).

In this way, the input and output characteristics of the battery has the relationship with the battery temperature and the state of charge SOC. Thus, in the EV traveling, it is necessary to ensure the battery output and input characteristics (regenerated energy) required for the EV traveling by controlling the battery temperature to be relatively high (generally, at 10° C. or higher).

On the other hand, in the engine traveling (HV traveling), the output is the sum of outputs from the engine 61 and the battery, and thus the regeneration depends on the input characteristics (regeneration) of the battery like the EV traveling. In general, since in the HV traveling, the state of charge SOC of the battery is controlled to be relatively low, for example, about 20 to 30%, the thermal management system can sufficiently cope with the low battery temperature (generally, 0° C. or higher), compared to in the EV traveling.

Figure 5:
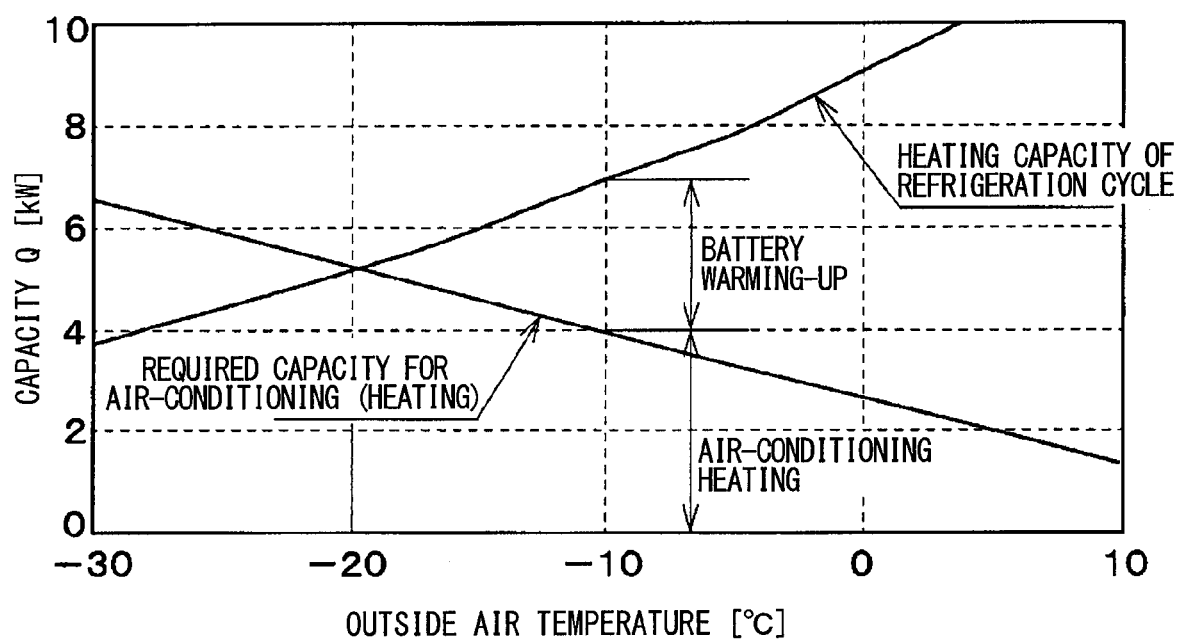
FIG. 5 is a graph showing the relationship between the outside air temperature and a heating capacity and a required heating capacity for a refrigeration cycle in the one embodiment.

Heat required for heating (warming up) the battery is supplied by the refrigeration cycle 31. The refrigeration cycle 31 exhibits its heating capacity by the heat pump operation of absorbing heat from the outside air. Thus, as shown in FIG. 5, the heating capacity of the refrigeration cycle 31 is reduced as the outside air temperature is decreased. On the other hand, the heating capacity required for heating of the vehicle interior becomes higher as the outside air temperature is decreased.

The refrigeration cycle 31 is generally designed in such a manner that the heating capacity exhibited when the outside air temperature is at −20° C. is identical to a required heating capacity. Thus, when the outside air temperature is −20° C. or higher, the refrigeration cycle 31 can heat (warm up) the battery by supplying heat for some purpose other than the heating.

In winter, it is necessary to heat the vehicle interior, warm up the battery, and warm up the engine 61. The hybrid vehicle basically performs the EV traveling as long as the battery has a state of charge SOC. In the case of the HV traveling, when the battery has cooled and the input and output characteristics cannot be ensured, the HV traveling using the traveling electric motor cannot be performed, and the engine traveling without using the traveling electric motor must be undertaken, thus degrading the fuel efficiency.

Thus, to suppress the degradation in fuel efficiency, warming-up of the battery takes priority over warming-up of the engine 61.

The vehicle interior is heated according to the request for air-conditioning from the occupant. Thus, to ensure a comfortable level of air-conditioning, the vehicle interior needs to be heated in priority to warming-up of the battery and engine 61.

Note that the battery should be warmed up in priority to the heating of the vehicle interior only when the battery is completely cold, failing to ensure the safety of the vehicle (the traveling performance of such a level that the vehicle can travel a public road without any problem).

Figure 6:
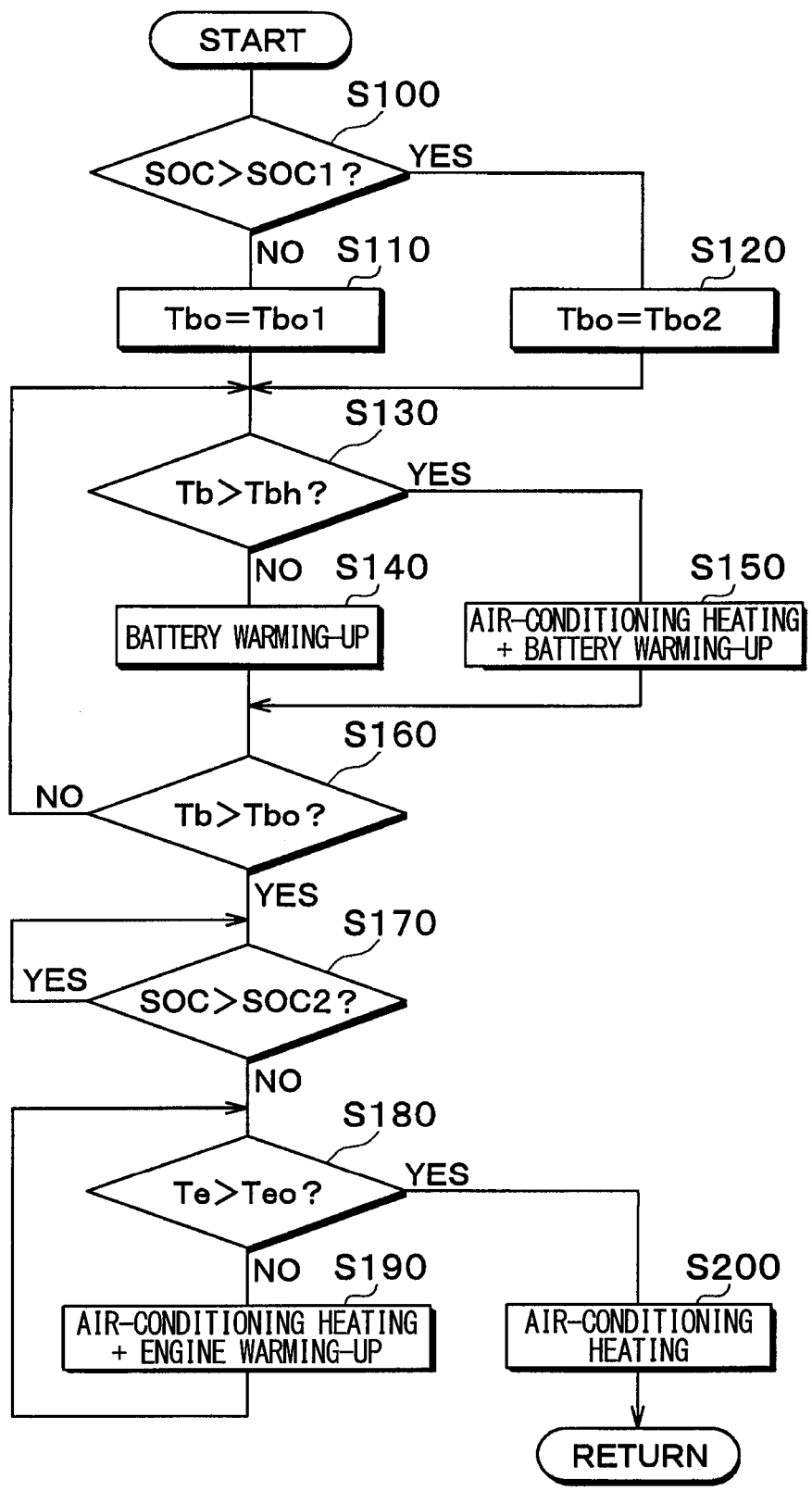
FIG. 6 is a flow chart showing a control processing executed by a controller in the one embodiment.

To satisfy such an order of priority among heating the vehicle interior, warming up the battery, and warming up the engine 61, the controller 70 executes control processing as shown in a flowchart of FIG. 6.

The hybrid vehicle has a very large battery and thus requires a very large amount of energy to warm up the battery. When the regenerated energy through improvement of the input characteristics of the battery is less than the energy used to warm up the battery, the EV traveling distance might disadvantageously be reduced. Thus, the battery needs to be reasonably warmed up to an appropriate level.

The regenerated energy tends to increase as the traveling distance or traveling time also increases. As an EV travelable distance after warming-up of the battery becomes longer, the battery is more preferably warmed up sufficiently to improve the battery input characteristics.

In steps S100 to S120, a target warming-up temperature for the battery is determined. In step S100, it is determined whether or not the state of charge SOC of the battery exceeds the first state-of-charge threshold SOC1. The first state-of-charge threshold SOC1 is a value associated with the EV travelable distance after warming-up of the battery. When the state of charge SOC exceeds the first state-of-charge threshold SOC1, the EV travelable distance after warming up the battery is determined to be long. When the state of charge SOC does not exceed the first state-of-charge threshold SOC1, the EV travelable distance after warming-up of the battery is determined to be short.

Figure 7:
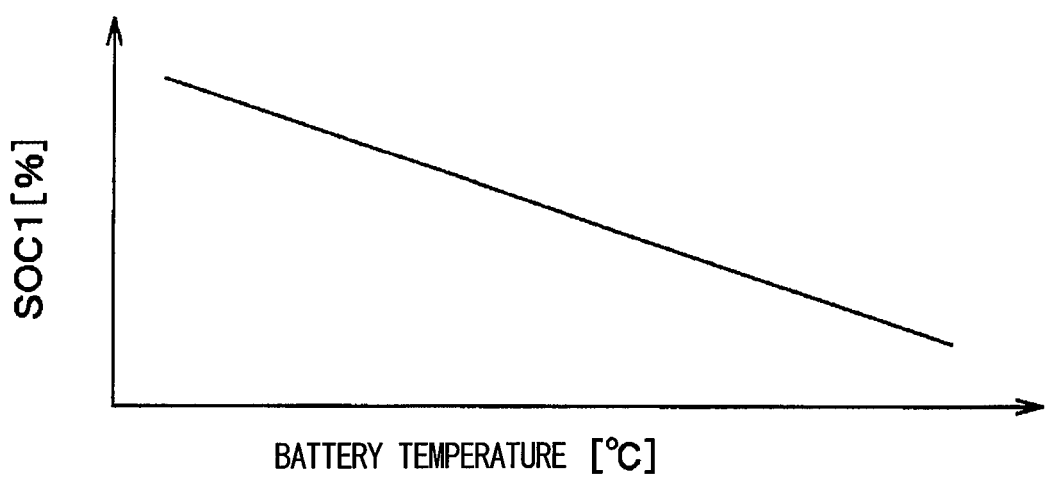
FIG. 7 is a graph showing the relationship between a battery temperature and a first state-of-charge threshold in the one embodiment.

As shown in FIG. 7, the first state-of-charge threshold SOC1 is determined depending on the temperature of the battery before the warming-up. That is, as the battery temperature before the warming-up is lowered, the energy to be used for warming up the battery is increased. Thus, the first state-of-charge threshold SOC1 is set higher as the battery temperature before the warming-up becomes lower.

When the state-of-charge SOC is determined not to exceed the first state-of-charge threshold SOC1 in step S100, then, the operation proceeds to step S110, in which a target battery warming-up temperature Tbo is determined to be a target HV-traveling battery warming-up temperature Tbo1 (e.g., 0° C.).

On the other hand, when the state-of-charge SOC is determined to exceed the first state-of-charge threshold SOC1, the operation proceeds to step S120, in which the target battery warming-up temperature Tbo is determined to be a target EV-traveling battery warming-up temperature Tbo2 (e.g., 10° C.).

The target EV-traveling battery warming-up temperature Tbo2 is higher than the target HV-traveling battery warming-up temperature Tbo1.

In this way, when an EV traveling distance after the warming-up of the battery can be determined to be long, the target battery warming-up temperature Tbo is set to a higher temperature Tbo2 (e.g., 10° C.). On the other hand, when an EV traveling distance after warming up the battery can be determined to be short, the target battery warming-up temperature Tbo is set to a lower temperature Tbo1 (e.g., 0° C.).

In step S130, it is determined whether or not the battery temperature Tb exceeds a battery temperature threshold Tbh. The battery temperature Tb is, for example, a temperature (typical battery temperature) that is detected by a battery temperature sensor (not shown) provided at a specific part in a battery pack with fluctuations in temperature.

The battery temperature threshold Tbh is set equal to or lower than a battery temperature (generally, −10° C.) that does not allow for the EV traveling in an urban area.

When the battery temperature Tb is lower than the battery temperature threshold Tbh, adequate output cannot be ensured from the battery, thus failing to achieve the safe traveling. Thus, it is determined that the battery should be warmed up in priority to other components.

When the battery temperature Tb is higher than the battery temperature threshold Tbh, the battery output required for safe traveling can be ensured to some degree. Thus, it can be determined that the vehicle interior needs to be warmed up in priority to warming up the battery.

As mentioned above, the refrigeration cycle 31 is generally designed in such a manner that the heating capacity exhibited when the outside air temperature is −20° C. is identical to an air-conditioning request capacity. Thus, when the outside air temperature is −10° C., the refrigeration cycle 31 has an extra heating capacity with respect to the required heating capacity, and thus has the capacities of simultaneously heating the vehicle interior and warming up the battery.

When the battery temperature Tb is determined not to exceed the battery temperature threshold Tbh in step S130, the operation proceeds to step S140, in which the battery is warmed up. When the battery temperature Tb is determined to exceed the battery temperature threshold Tbh, the operation proceeds to step S150, in which the air-conditioning heating and the battery warming-up are performed.

Figure 8:
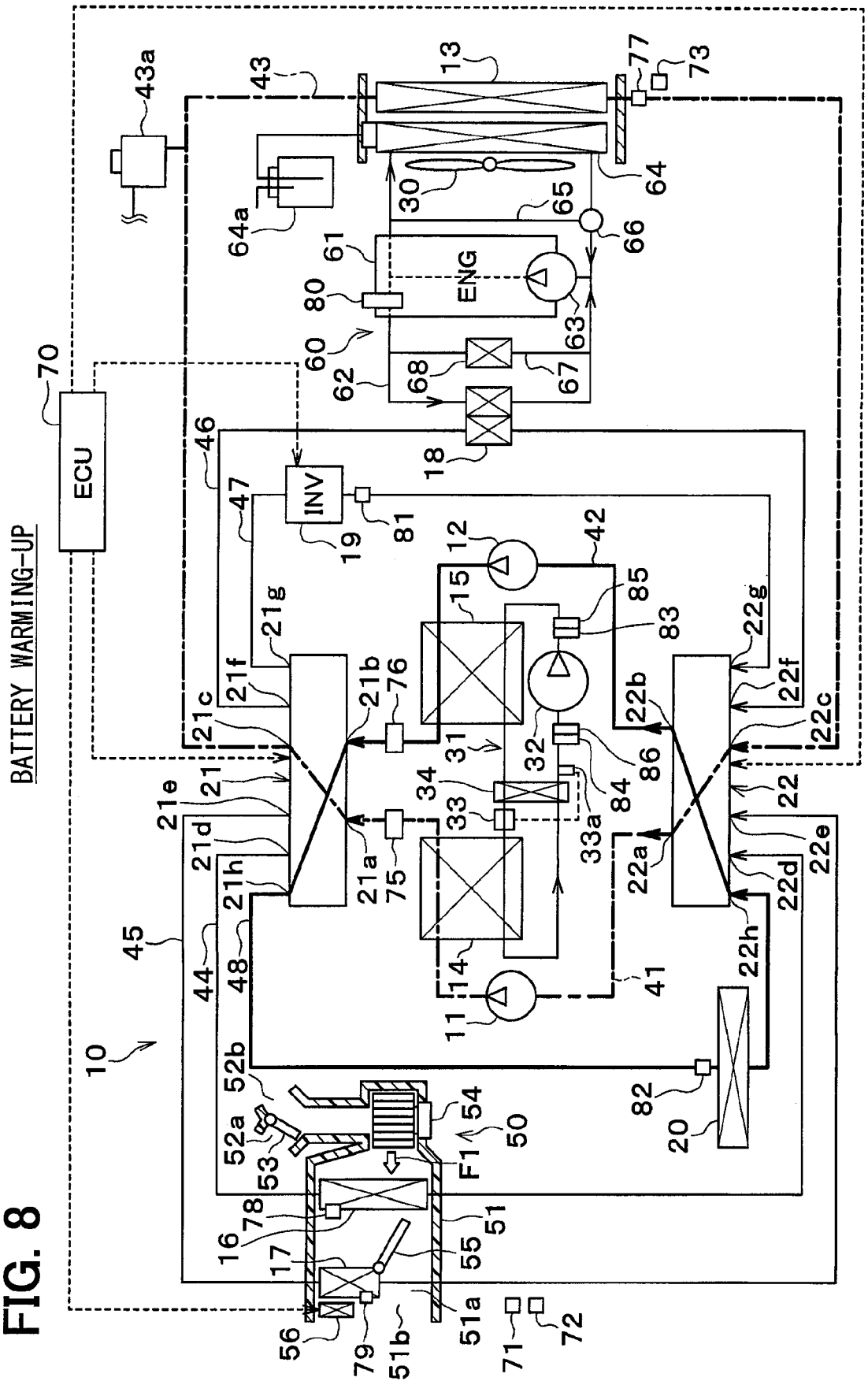
FIG. 8 is a diagram showing a coolant circulation state during battery warming-up in the one embodiment.

When the battery is warmed up in step S140, as shown in FIG. 8, the coolant cooled by the coolant cooler 14 circulates through the radiator 13, and the coolant heated by the coolant heater 15 circulates through the battery-temperature adjustment heat exchanger 20, whereby the battery is heated (warmed up) by pumping the heat from the outside air in the heat pump operation of the refrigeration cycle 31.

Figure 9:
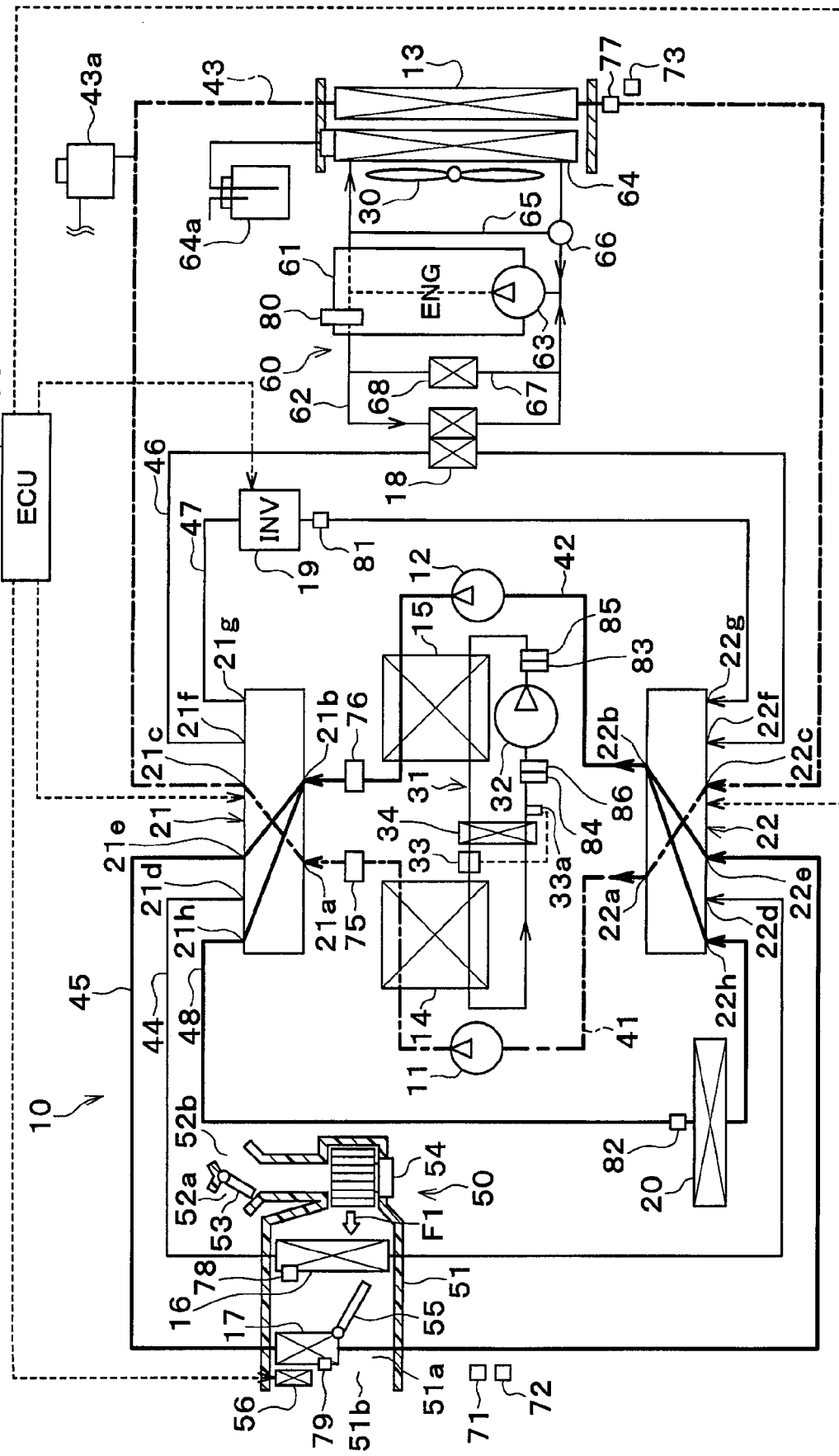
FIG. 9 is a diagram showing a coolant circulation state during air-heating+battery warming-up in the one embodiment.

In the air-conditioning heating and the battery warming-up at step S150, as shown in FIG. 9, the coolant cooled by the coolant cooler 14 circulates through the radiator 13, and the coolant heated by the coolant heater 15 circulates through the heater core 17 and the battery-temperature adjustment heat exchanger 20. Thus, the vehicle interior is heated while the battery is heated (warmed up) by pumping the heat from the outside air in the heat pump operation of the refrigeration cycle 31.

In step S160, it is determined whether or not the battery temperature Tb exceeds the target battery warming-up temperature Tbo. When the battery temperature Tb is determined not to exceed the target battery warming-up temperature Tbo, the warming-up of the battery can be determined to be insufficient, and then the operation returns to the step S130, in which the warming-up of the battery is continued.

When the battery temperature Tb is determined to exceed the target battery warming-up temperature Tbo, the warming-up of the battery can be determined to be sufficient, and then the operation proceeds to step S170.

In step S170, the timing of warming up the engine 61 is determined. The reason for warming up the engine 61 is that the temperature of an intake portion of the engine 61 or a combustion chamber is increased while the engine 61 is cold, thereby preventing the use of excessive fuel (reducing an increase in used fuel), reducing the friction.

Since the warming-up of the engine 61 needs to be completed immediately before start-up of the engine traveling (HV traveling), the warming-up of the engine 61 should be started at the timing that is determined by back calculation of a time period up to the start-up of the engine traveling (HV traveling) from the EV travelable distance.

In step S170, it is determined whether or not the state of charge SOC exceeds the second state-of-charge threshold SOC2. The second state-of-charge threshold SOC2 is a value associated with the EV travelable distance after warming-up of the engine. When the state of charge SOC exceeds the second state-of-charge threshold SOC2, the EV travelable distance after warming up the engine can be determined to be long. When the state of charge SOC does not exceed the second state-of-charge threshold SOC2, the EV travelable distance after warming-up of the engine can be determined to be short.

Figure 10:
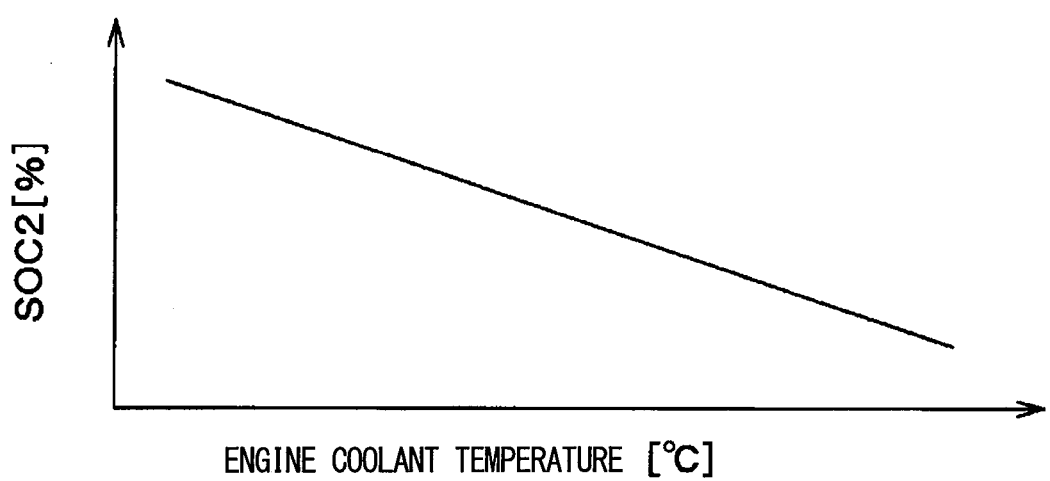
FIG. 10 is a graph showing the relationship between a battery temperature and a second state-of-charge threshold in the one embodiment.

As shown in FIG. 10, the second state-of-charge threshold SOC2 is determined depending on the engine coolant temperature (temperature associated with the temperature of the engine 61) before warming up. That is, as the engine coolant temperature becomes lower before warming up, the energy consumed for warming-up of the engine is increased to shorten the EV travelable distance after warming up the engine. Thus, as the engine coolant temperature before warming-up is lower, the second state-of-charge threshold SOC2 is set higher.

When the state of charge SOC is determined to exceed the second state-of-charge threshold SOC2 in step S170, the present time can be determined not to be the timing when the warming-up of the engine 61 is started, and thus the operation returns to step S170.

On the other hand, when the state of charge SOC is determined not to exceed the second state-of-charge threshold SOC2 in step S170, the present time can be determined to be at the timing when the warming-up of the engine 61 is started, and then the operation proceeds to step S180.

In step S180, it is determined whether or not the engine coolant temperature Te exceeds a target engine coolant temperature Teo. The target engine coolant temperature Teo is set, for example, to 40° C. That is, the engine coolant temperature generally needs to be 40° C. or higher to improve the combustion efficiency of the engine 61 and to reduce the friction loss thereof.

Thus, when the engine coolant temperature Te does not exceed the target engine coolant temperature Teo, the warming-up of the engine 61 can be determined to be necessary. On the other hand, when the engine coolant temperature Te exceeds the target engine coolant temperature Teo, the warming-up of the engine 61 can be determined not to be required.

When the engine coolant temperature Te is determined not to exceed the target engine coolant temperature Teo in step S180, the operation proceeds to step S190, in which the air-conditioning heating and the warming-up of the engine are performed. Then, the operation returns to step S180. Thus, until the engine coolant temperature Te reaches the target engine coolant temperature Teo, the air-conditioning heating and the warming-up of the engine are executed.

When the engine coolant temperature Te is determined to exceed the target engine coolant temperature Teo in step S180, the operation proceeds to step S200, in which the air-conditioning heating is performed. That is, once the engine coolant temperature Te reaches the target engine coolant temperature Teo, the warming-up of the battery and the engine 61 is not required any more, and only the heating of the vehicle interior is necessary.

Figure 11:
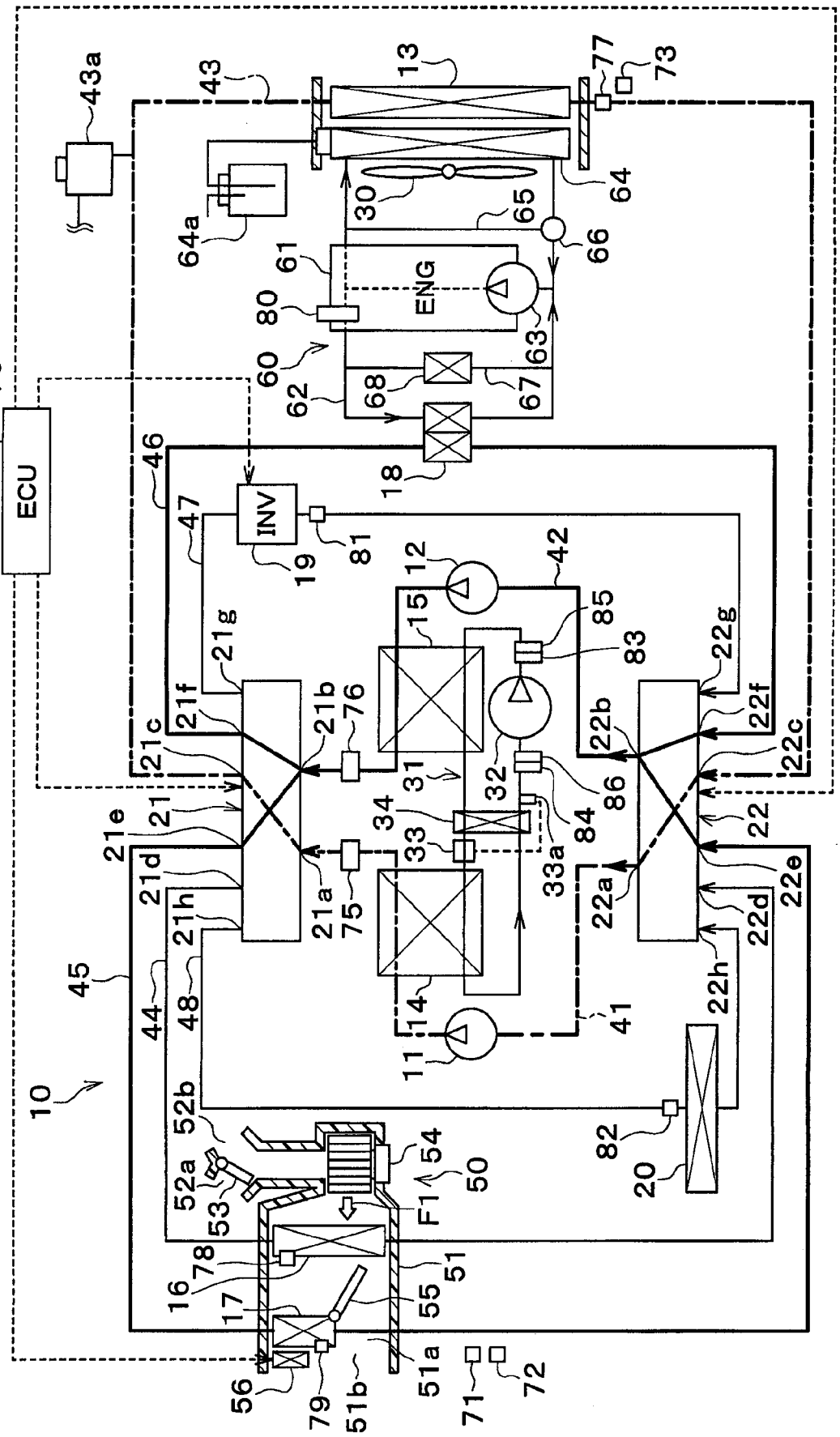
FIG. 11 is a diagram showing a coolant circulation state during air-heating+engine warming-up in the one embodiment.

In the air-conditioning heating and the engine warming-up at step S190, as shown in FIG. 11, the coolant cooled by the coolant cooler 14 circulates through the radiator 13, and the coolant heated by the coolant heater 15 circulates through the heater core 17 and the coolant-coolant heat exchanger 18, whereby the engine 61 is heated (warmed up) while the vehicle interior is heated by pumping the heat from the outside air in the heat pump operation of the refrigeration cycle 31.

Figure 12:
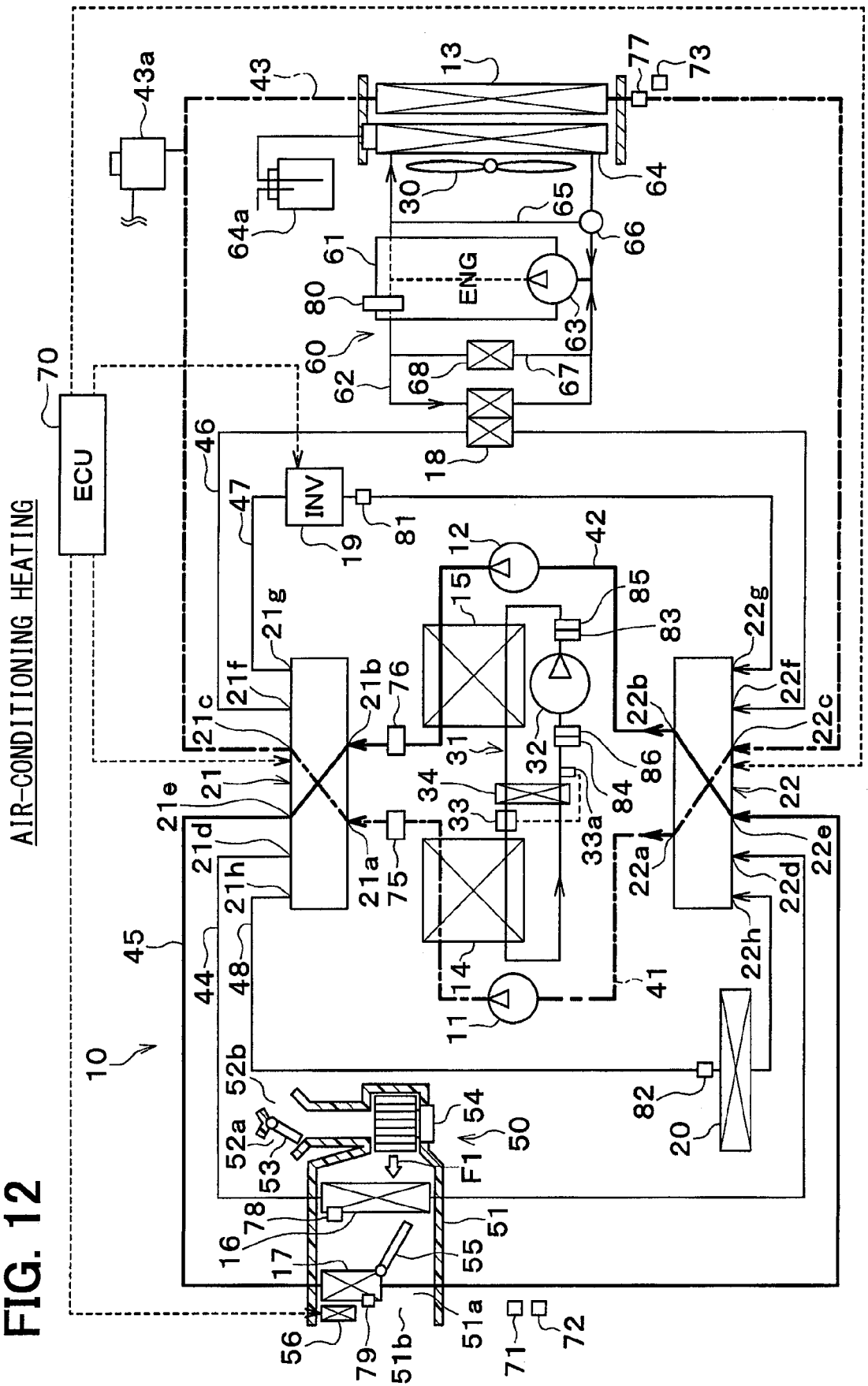
FIG. 12 is a diagram showing a coolant circulation state during air-heating in the one embodiment.

When the air-conditioning heating is performed in step S200, as shown in FIG. 12, the coolant cooled by the coolant cooler 14 circulates through the radiator 13, and the coolant heated by the coolant heater 15 circulates through the heater core 17, whereby the vehicle interior is heated by pumping the heat from the outside air in the heat-pump operation of the refrigeration cycle 31.

When the air-conditioning heating is performed in step S200, the coolant-coolant heat exchanger 18 may be connected to the heater core 17, so that the vehicle interior may be heated with waste heat from the engine 61.

When the air-conditioning heating is performed in step S200, the warming-up of the battery and engine 61 is not required, and only the heating of the vehicle interior is required. Thus, the refrigeration cycle 31 does not need to exhibit the maximum heating capacity and is controlled to exhibit the heating capacity required for heating of the vehicle interior.

Figure 13:
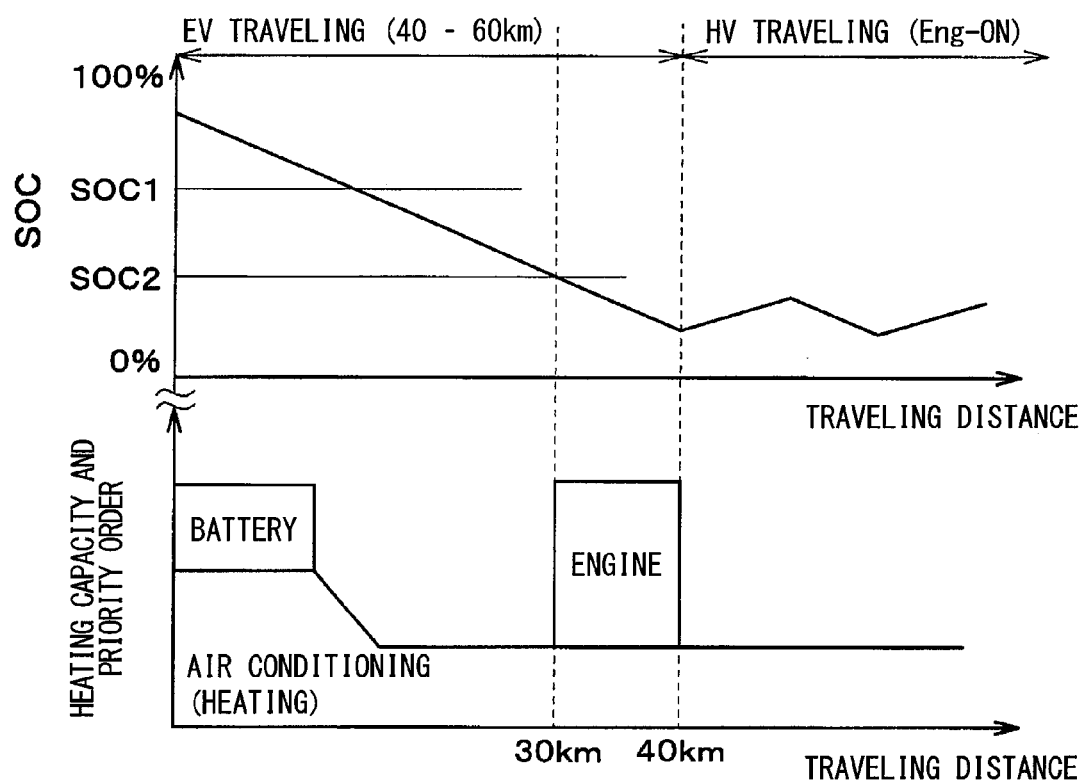
FIG. 13 is a graph showing the relationship between a traveling distance and a state of charge SOC, as well as transition of a heating capacity of the refrigeration cycle with respect to the traveling distance in the one embodiment.

FIG. 13 shows an example of the relationship between the traveling distance and the state of charge SOC in the control described above, while showing examples of the transfer of the heating capacity and the usages of the heating capacity (which one of the battery warming-up, the vehicle-interior heating, and the engine warming-up is used) in the refrigeration cycle 31.

In this way, the battery warming-up, the vehicle-interior heating, and the engine warming-up are sequentially performed in the order of priority depending on the situation, which can reduce the maximum heating capacity of the refrigeration cycle 31, while ensuring the traveling safety and air-conditioning comfort.

In this embodiment, when both the battery and engine 61 need to be warmed up, the controller 70 controls the first switching valve 21 and the second switching valve 22 to set a battery warming-up state in which the coolant circulates through between the battery-temperature adjustment heat exchanger 20 and the coolant heater 15, but does not circulate through between the coolant-coolant heat exchanger 18 and the coolant heater 15. Then, when the battery temperature Tb exceeds the target battery warming-up temperature Tbo in the battery warming-up state, the controller 70 controls the first switching valve 21 and the second switching valve 22 to set an engine warming-up state in which the coolant circulates through between the coolant-coolant heat exchanger 18 and the coolant heater 15, but does not circulate through between the battery-temperature adjustment heat exchanger 20 and the coolant heater 15.

In this way, when both the battery and engine 61 are required to be warmed up, the battery is warmed up before warming up the engine 61. Thus, such a refrigerant cycle 31 can suppress its required heating capacity, compared to the case in which the battery is warmed up at the same time as warming-up of the engine 61.

Further, the battery is warmed up on a priority basis, so that the input and output characteristics of the battery can be quickly ensured, thereby enhancing the operating rate of a traveling electric motor, thus improving the fuel efficiency of the engine 61.

In this embodiment, as described in steps S100 to S120, when the battery state of charge SOC of the battery is higher than the first state-of-charge threshold SOC1, the controller 70 sets the target battery warming-up temperature Tbo large, compared to the case in which the state of charge SOC of the battery is smaller than the first state-of-charge threshold SOC1.

In this way, the controller can increase the temperature of the battery after warming-up, thereby improving the input characteristics of the battery, when the distance travelable by the traveling electric motor after warming up the battery can be expected to be so long that the regenerated energy becomes large. Thus, the operating rate of the traveling electric motor can be further enhanced, thereby improving the fuel efficiency of the engine 61.

In this embodiment, as described in step S100 (see FIG. 7), the controller 70 sets the first state-of-charge threshold SOC1 to a larger value as the battery temperature Tb is decreased. This arrangement can prevent the energy consumption for warming up the battery from being excessively large when the battery temperature Tb before the warming-up is low.

As described in steps S130 and S140, in this embodiment, the controller 70 controls the first switching valve 21 and the second switching valve 22 to set the state in which the coolant does not circulate through between the heater core 17 and the coolant heater 15 when the coolant circulates through between the battery-temperature adjustment heat exchanger 20 and the coolant heater 15, and the battery temperature Tb is equal to or lower than the battery temperature threshold Tbh.

With this arrangement, when the output characteristics of the battery is reduced because of its low battery temperature Tb, the battery can be warmed up in priority to heating of the vehicle interior. Thus, the required heating capacity of the refrigeration cycle 31 can be reduced while ensuring the output from the traveling electric motor.

In this embodiment, as described in steps S160 to 190, the controller 70 controls the first and second switching valves 21 and 22 to set the state in which the coolant circulates through between the coolant-coolant heat exchanger 18 and the coolant heater 15 when the battery temperature Tb reaches the target battery warming-up temperature Tbo, and the state of charge SOC of the battery is smaller than the second state-of-charge threshold SOC2.

With this arrangement, the warming-up of the engine 61 is started when the warming-up of the battery is completed and the distance travelable by the traveling electric motor is short, which can prevent the energy from being wastefully consumed as the warming-up of the engine 61 is started at an unnecessarily early stage.

In this embodiment, as described in step S170 (see FIG. 10), the controller 70 sets the second state-of-charge threshold SOC2 to a larger value as the temperature Te of the engine 61 is lowered. Thus, as the time required to warm up the engine 61 is increased, the warming-up of the engine 61 can be started at an earlier stage, whereby the warming-up of the engine 61 can be started at an appropriate timing.

In this embodiment, the coolant is allowed to circulate through between the inverter 19 and the coolant-cooling heat exchanger 14, so that the waste heat from the inverter 19 is pumped up by the heat pump operation of the refrigeration cycle 31 and thus can be used to warm up the engine 61, which can reduce the required heating capacity of the refrigeration cycle 31.

Other Embodiments

Various modifications and changes can be made to the above-mentioned embodiments, for example, as follows.

(1) Although in each of the above-mentioned embodiments, a coolant is used as the heat medium for adjusting the temperature of a temperature-adjustment target device, various kinds of media, such as oil, may be used as the heat medium.

Alternatively, nanofluid may be used as the heat medium. The nanofluid is a fluid containing nanoparticles having a diameter of the order of nanometer. By mixing the nanoparticles into the heat medium, the following actions and effects can be obtained, in addition to an action and effect of decreasing a freezing point, like a coolant (so-called antifreeze) using ethylene glycol.

That is, the use of the nanofluid can exhibit actions and effects of improving a thermal conductivity in a specific temperature range, increasing a thermal capacity of the heat medium, preventing the corrosion of a metal pipe and the degradation of a rubber pipe, and enhancing the fluidity of the heat medium at an ultralow temperature.

These actions and effects are varied depending on the configuration, shape, and blending ratio of the nanoparticles, and additive material.

Thus, the use of the nanofluid can improve its thermal conductivity, and thus even in a small amount, can exhibit the substantially same cooling efficiency as that of the coolant using ethylene glycol.

Further, such a heat medium can also improve its thermal capacity and increase a cold storage amount (cold storage due to its sensible heat) of the heat medium itself.

By increasing the cold storage amount, the cooling and heating temperatures of a device using the cold storage can be adjusted for some time period even though the compressor 32 is not operated, which can lead to power saving in the vehicle thermal management system.

An aspect ratio of the nanoparticle is preferably 50 or more. This is because such an aspect ratio can provide the adequate thermal conductivity. Note that the aspect ratio of the nanoparticle is a shape index indicating the ratio of the width to the height of the nanoparticle.

Nanoparticles suitable for use can include any one of Au, Ag, Cu, and C. Specifically, atoms configuring the nanoparticles can include an Au nanoparticle, an Ag nanowire, a carbon nanotube (CNT), a graphene, a graphite core-shell nanoparticle (a particle body with the above-mentioned atom surrounded by a structure, such as a carbon nanotube), an Au nanoparticle-containing CNT, and the like.

(2) In the refrigeration cycle 31 of each of the embodiments, fluorocarbon refrigerant is used as the refrigerant. However, the kind of refrigerant is not limited thereto, and may be natural refrigerant, such as carbon dioxide, a hydrocarbon refrigerant, and the like.

The refrigeration cycle 31 in each of the above-mentioned embodiments constitutes a subcritical refrigeration cycle in which its high-pressure side refrigerant pressure does not exceed the critical pressure of the refrigerant, but may constitute a super-critical refrigeration cycle in which its high-pressure side refrigerant pressure exceeds the critical pressure of the refrigerant.

(3) In the embodiments described above, in step S100, as the battery temperature before warming-up is decreased, the first state-of-charge threshold SOC1 is set to a higher value. However, alternatively, the first state-of-charge threshold SOC1 may be determined based on a route plan or a traveling pattern history set by the car navigation system 90 (see FIG. 2).

Specifically, the first state-of-charge threshold SOC1 should be set to a lower value when the route plans and traveling pattern histories set by the car navigation system 90 are learned, so that a number of downhill roads or requirements to start and stop, as well as a large amount of regenerated energy can be expected. On the other hand, the first state-of-charge threshold SOC1 should be set to a higher value when the vehicle travels at a certain speed on a highway or the like with high frequency.

Thus, the temperature of the battery after the warming-up can be adjusted depending on the expected amount of regenerated energy, thereby adjusting the input characteristics of the battery.

(4) In the above-mentioned embodiments, whether the EV travelable distance after warming-up of the battery is long or not is determined based on whether or not the state of charge SOC exceeds the first state-of-charge threshold SOC1 in step S100. Alternatively, whether the EV travelable distance after warming-up of the battery is long or not may be determined based on the EV traveling distance or EV traveling time displayed on a monitor of the vehicle.

(5) In the embodiments described above, in step S160, as the engine coolant temperature before warming-up is decreased, the second state-of-charge threshold SOC2 is set to a higher value. However, alternatively, the second state-of-charge threshold SOC2 may be determined based on a route plan or a traveling pattern history set by the car navigation system 90.

Specifically, the second state-of-charge threshold SOC2 should be set to a lower value when the route plans and traveling pattern histories set by the car navigation system 90 are learned, so that a large amount of waste heat can be expected from heat generating devices, such as the inverter 19. On the other hand, the second state-of-charge threshold SOC2 should be set to a higher value when a large amount of waste heat cannot be expected from the heat generating devices, such as the inverter 19.

Thus, the timing of starting warming-up of the engine 61 can be adjusted in accordance with the expected amount of waste heat from the device.

When the vehicle can be determined to reach the destination before warming up the engine 61 from the route plan set by the car navigation system 90, the engine 61 may not be warmed up.

(6) Although in the above-mentioned embodiments, in step S160, the timing of starting warming-up of the engine 61 is determined based on the state of charge SOC, the timing of starting warming-up of the engine 61 may be determined based on the EV traveling distance or EV traveling time displayed on the monitor of the vehicle.

(7) In the embodiments described above, when the heating capacity of the refrigeration cycle 31 is lacking with respect to a required capacity, the heat generating device, such as the inverter 19, may be connected to the coolant cooler 14, causing the refrigeration cycle 31 to absorb the waste heat from the heat generating device, such as the inverter 19. In this way, the amount of heat absorbed by the refrigeration cycle 31 can be increased to enhance the heating capacity thereof.

Furthermore, the controller 70 may intentionally reduce the operating efficiency of the power generating device, such as the inverter 19, thereby increasing the amount of heat generated from the heat generating device (waste heat amount), such as the inverter 19.

(8) Although in the above-mentioned embodiments, the coolant discharged from the first pump 11 or second pump 12 exchanges heat with the engine coolant in the engine cooling circuit 60 via the coolant-coolant heat exchanger 18, the coolant discharged from the first pump 11 or second pump 12 may circulate through the engine cooling circuit 60 via a flow-path switching valve.

In this embodiment, the coolant flow path of the engine 61 constitutes an engine heat transfer portion that transfers heat between the engine 61 and the coolant.

The flow-path switching valve is a switching device that switches the coolant discharged from the first pump 11 or second pump 12 between a state in which the coolant circulates through the engine cooling circuit 60 and a state in which the coolant does not circulate therethrough.

(9) Although in the above-mentioned embodiments, the inverter 19 is provided as the heat generating device that has its amount of heat generation changing depending on the traveling state of the vehicle, various heat generating devices other than or in addition to the inverter 19 may be provided. Other examples of the heat generating devices in which the amount of generated heat changes depending on the traveling state of the vehicle can include a traveling electric motor, various engine components, and the like.

Various engine components can include a turbocharger, an intercooler, an EGR cooler, a CVT warmer, a CVT cooler, an exhaust-heat recovery device, and the like.

The turbocharger is a supercharger that supercharges intake air of the engine (intake). The intercooler is an intake cooler (intake-heat medium heat exchanger) that cools a supercharged intake by exchanging heat between the coolant and the supercharged intake at a high temperature compressed by the turbocharger.

The EGR cooler is an exhaust gas-coolant heat exchanger (exhaust air-heat medium heat exchanger) that cools exhaust air by exchanging heat between the coolant and an engine exhaust gas (exhaust air) to be returned to the intake side of the engine.

The continuously variable transmission (CVT) warmer is a lubricating oil-coolant heat exchanger (lubricating oil-heat medium heat exchanger) that heats a lubricating oil (CVT oil) by exchanging heat between the coolant and the CVT oil for lubricating the CVT.

The CVT cooler is a lubricating oil-coolant heat exchanger (lubricating oil-heat medium heat exchanger) that cools the CVT oil by exchanging heat between the CVT oil and the coolant.

The exhaust-heat recovery device is an exhaust air-coolant heat exchanger (exhaust air-heat medium heat exchanger) that exchanges heat between the exhaust air and the coolant, thereby absorbing heat from the exhaust air into the coolant.

What is claimed is:

1. A thermal management system for a vehicle, comprising:
    a first pump and a second pump, which are adapted to draw and discharge a heat medium;
    a compressor adapted to draw and discharge a refrigerant;
    a heat-medium heating heat exchanger that heats the heat medium by exchanging heat between the refrigerant discharged from the compressor and the heat medium drawn into and discharged from the second pump;
    a decompressor that decompresses and expands the refrigerant flowing out of the heat-medium heating heat exchanger;
    a heat-medium cooling heat exchanger that cools the heat medium by exchanging heat between the refrigerant decompressed and expanded by the decompressor and the heat medium drawn into and discharged from the first pump;
    a heat medium-outside air heat exchanger that exchanges heat between the heat medium cooled by the heat-medium cooling heat exchanger and outside air;
    an air heating heat exchanger that heats ventilation air into a vehicle interior by exchanging sensible heat between the heat medium heated by the heat-medium heating heat exchanger and the ventilation air;
    an engine heat transfer portion that transfers heat between an engine outputting a traveling driving force and the heat medium;
    a battery heat transfer portion that transfers heat between a battery supplying electric power to a traveling electric motor and the heat medium;
    a switching device that switches between a state in which the heat medium circulates through the heat-medium heating heat exchanger and a state in which the heat medium does not circulate through the heat-medium heating heat exchanger with respect to each of the engine heat transfer portion and the battery heat transfer portion; and
    a controller that controls the switching device (i) to set a battery warming-up state in which the heat medium circulates between the battery heat transfer portion and the heat-medium heating heat exchanger while the heat medium does not circulate between the engine heat transfer portion and the heat-medium heating heat exchanger when both the battery and engine need to be warmed up; and (ii) to set an engine warming-up state in which the heat medium circulates between the engine heat transfer portion and the heat-medium heating heat exchanger while the heat medium does not circulate between the battery heat transfer portion and the heat-medium heating heat exchanger when a temperature of the battery exceeds a target battery warming-up temperature in the battery warming-up state.

2. The thermal management system for a vehicle according to claim 1, wherein
    the battery stores a regenerated energy from the vehicle, and
    the controller sets the target battery warming-up temperature to a higher value when a state of charge of the battery is higher than the first state-of-charge threshold, compared to that when a state of charge of the battery is lower than the first state-of-charge threshold.

3. The thermal management system for a vehicle according to claim 2, wherein
    the controller determines the first state-of-charge threshold to be a higher value as the temperature of the battery is lowered.

4. The thermal management system for a vehicle according to claim 2, wherein
    the controller determines the first state-of-charge threshold based on a route plan output from a car navigation system.

5. The thermal management system for a vehicle according to claim 1, wherein
    the switching device is adapted to switch between a state in which the heat medium circulates and a state in which the heat medium does not circulate, between the air heating heat exchanger and the heat-medium heating heat exchanger, and
    the controller controls the switching device in such a manner that the heat medium does not circulate between the air heating heat exchanger and the heat-medium heating heat exchanger, when the heat medium circulates between the battery heat transfer portion and the heat-medium heating heat exchanger while the battery temperature is equal to or lower than a battery temperature threshold.

6. The thermal management system for a vehicle according to claim 1, wherein
    the controller controls the switching device in such a manner that the heat medium circulates between the engine heat transfer portion and the heat-medium heating heat exchanger when the battery temperature reaches the target battery warming-up temperature, and a state of charge of the battery is lower than a second state-of-charge threshold.

7. The thermal management system for a vehicle according to claim 6, wherein
    the controller determines the second state-of-charge threshold to be a higher value as the temperature of the engine is lowered.

8. The thermal management system for a vehicle according to claim 6, further comprising:
    a device heat transfer portion that transfers heat between the heat medium and a heat generating device in which an amount of generated heat changes depending on a traveling state of the vehicle, wherein
    the device heat transfer portion allows the heat medium to circulate between the heat-medium cooling heat exchanger and the device heat transfer portion, and
    the controller determines the second state-of-charge threshold based on a route plan output from a car navigation system.

9. The thermal management system for a vehicle according to claim 1, further comprising:
    a device heat transfer portion that transfers heat between a device generating heat during operation and the heat medium, wherein the device heat transfer portion allows the heat medium to circulate between the heat-medium cooling heat exchanger and the device heat transfer portion.

\* \* \* \* \*